United States Patent [19]

Beaulier et al.

[11] 4,122,487
[45] Oct. 24, 1978

[54] PRECISION PHASE CONTROLLED CLOCK FOR SAMPLING TELEVISION SIGNALS

[75] Inventors: Daniel A. Beaulier, Menlo Park; Luigi C. Gallo, Redwood City, both of Calif.

[73] Assignee: Ampex Corporation, Redwood City, Calif.

[21] Appl. No.: 763,453

[22] Filed: Jan. 28, 1977

[51] Int. Cl.² .................. H04N 5/78; H04N 9/02; H04B 1/04; H03B 3/04
[52] U.S. Cl. .......................................... 358/13; 358/4; 328/151; 331/20; 331/25
[58] Field of Search ...................... 358/4, 13, 141, 138, 358/19, 25, 8; 328/151, 63; 340/347 SH, 347 AD; 331/18, 20, 25

[56] References Cited
U.S. PATENT DOCUMENTS 3,946,432  3/1976  Goldberg et al. ............... 358/13

Primary Examiner—John C. Martin
Attorney, Agent, or Firm—Robert G. Clay; Ralph L. Mossino

[57] ABSTRACT

A method and apparatus is disclosed for sampling an analog information signal having an associated carrier signal at precise phase positions with respect to said carrier, which involves sampling the information signal at predetermined phase positions relative to the carrier signal using a phase locked loop to maintain the sampling positions reasonably close to the predetermined phase positions and thereafter examining the discrete samples and generating an error signal that indicates any phase deviation and adjusting the sampling so that the error signal approaches zero and the samples are taken at said precise phase positions.

25 Claims, 22 Drawing Figures

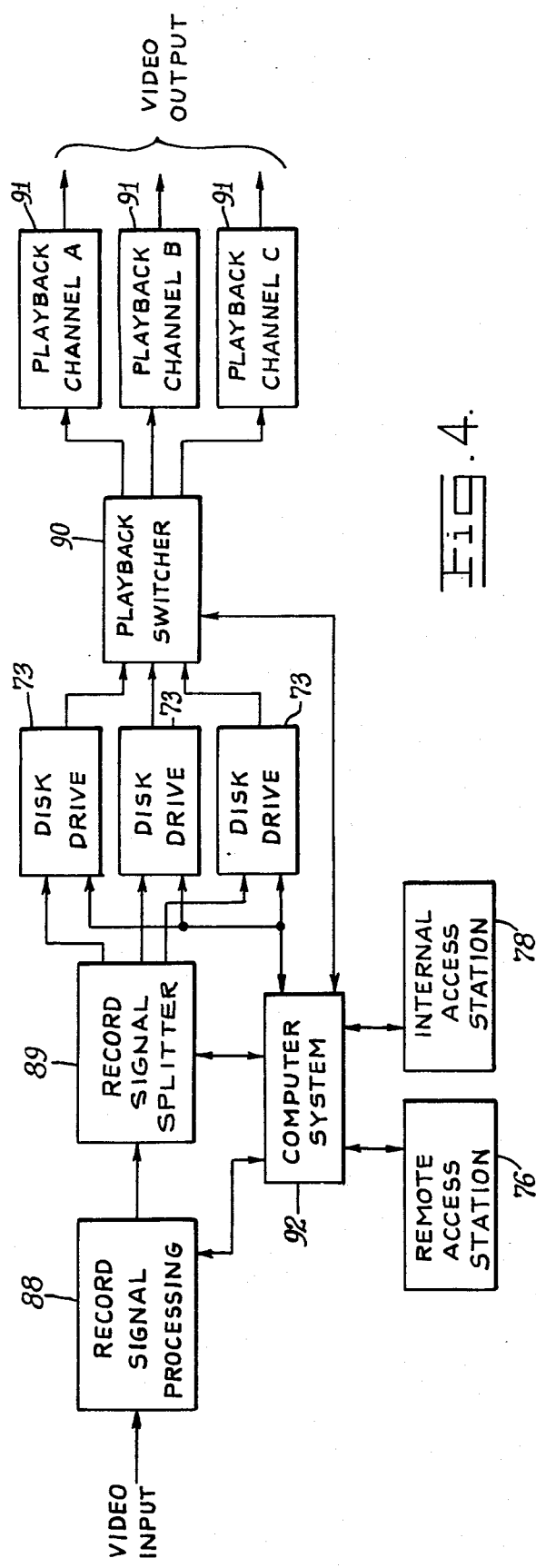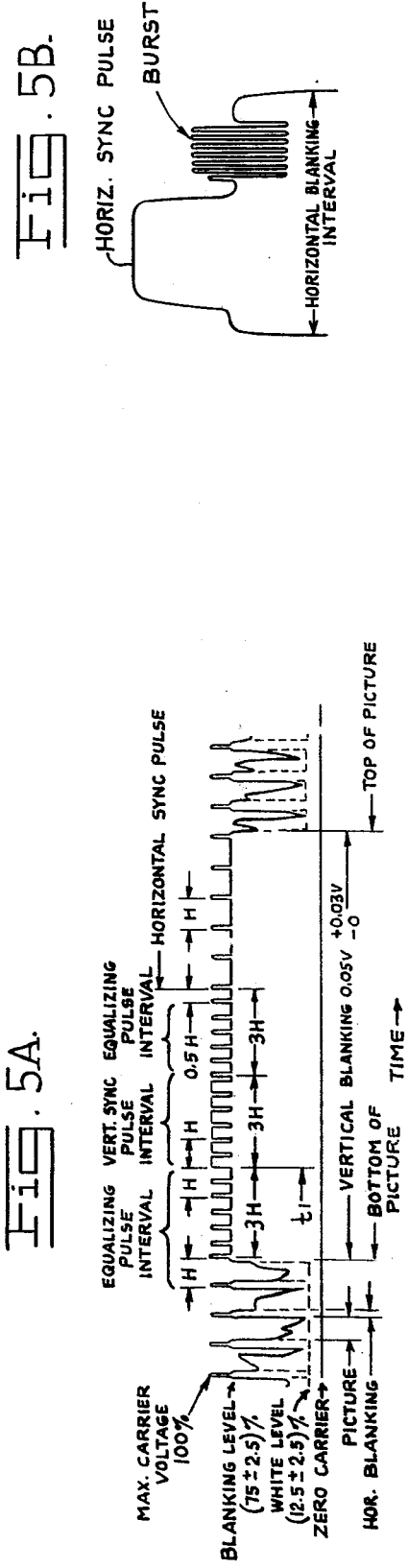

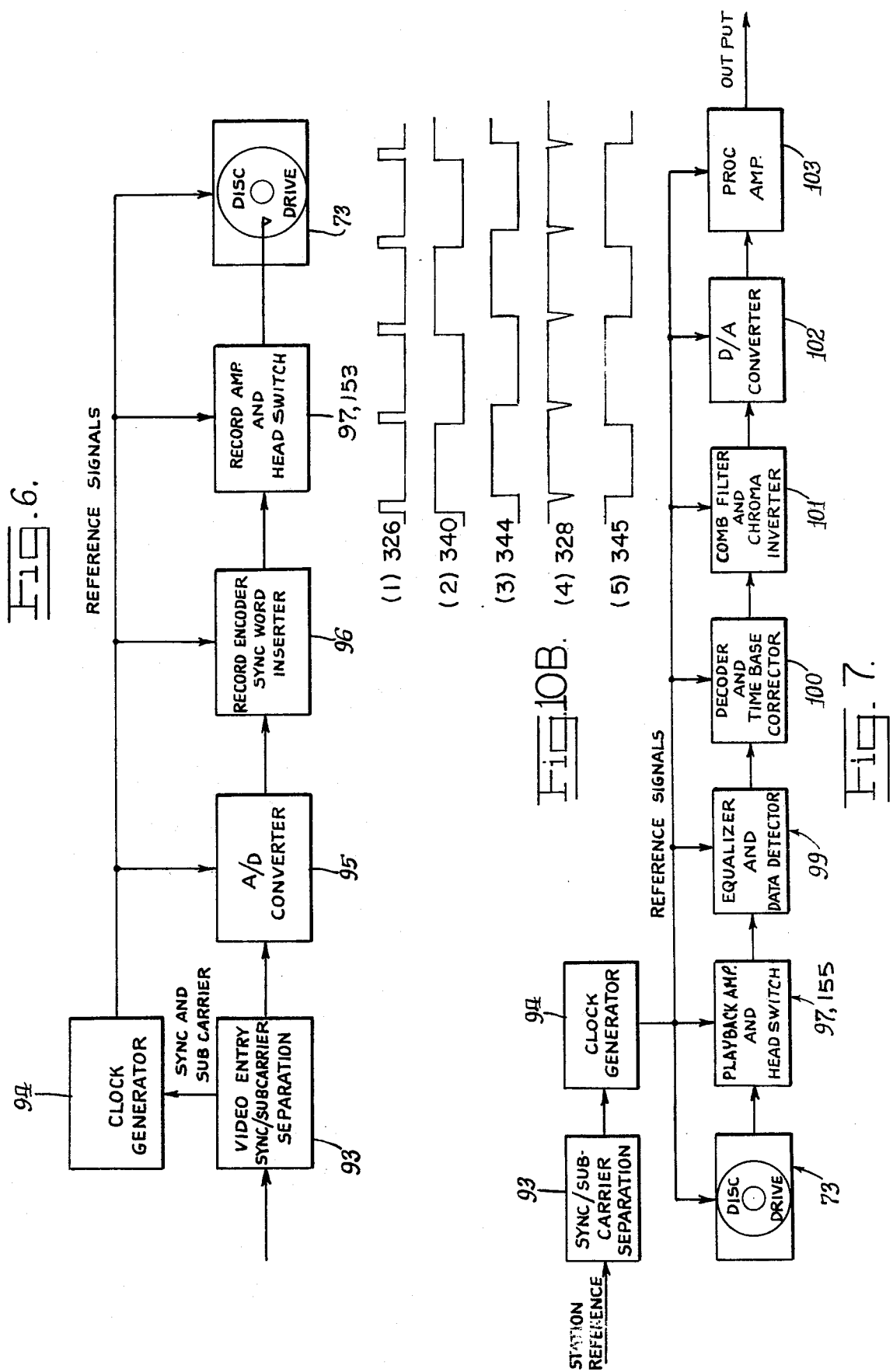

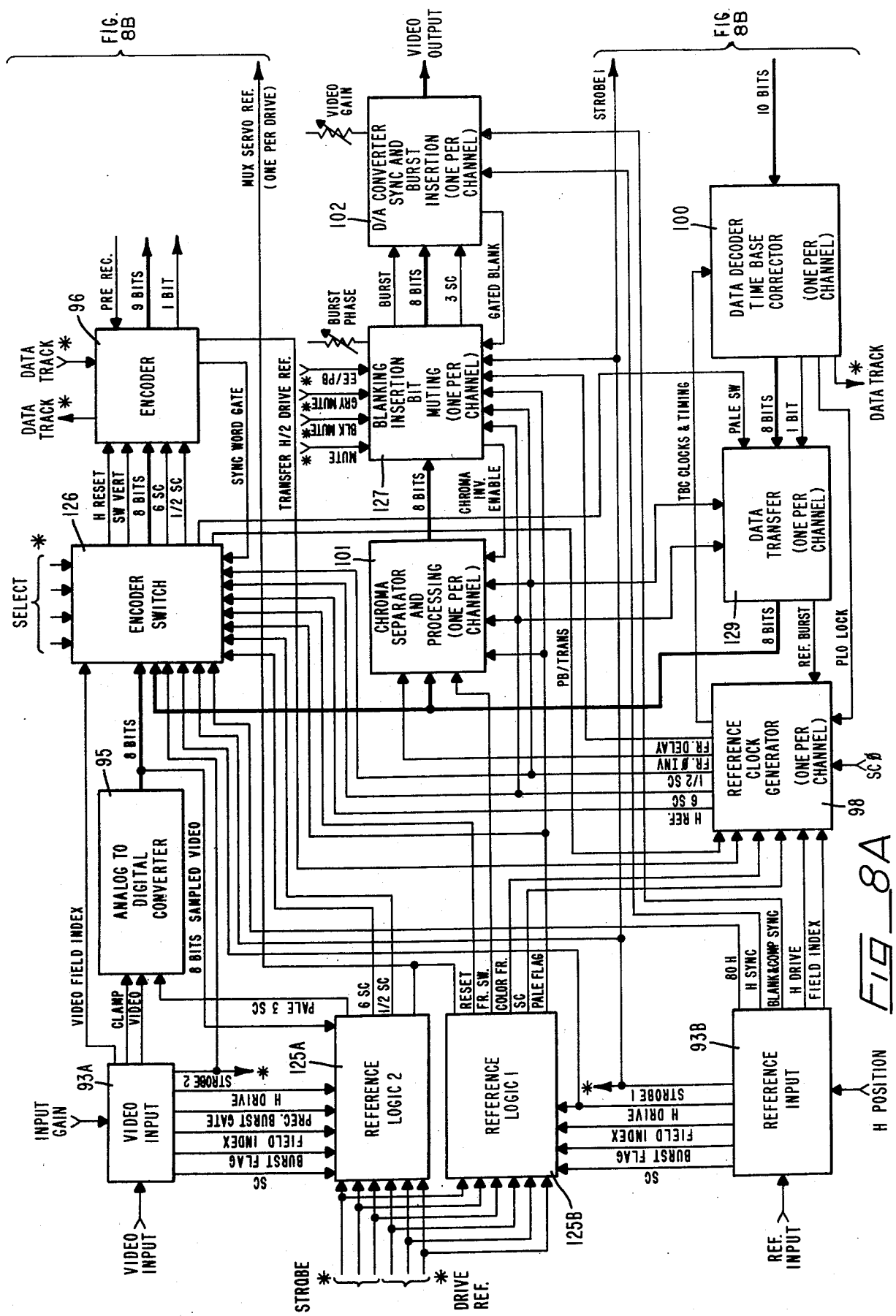

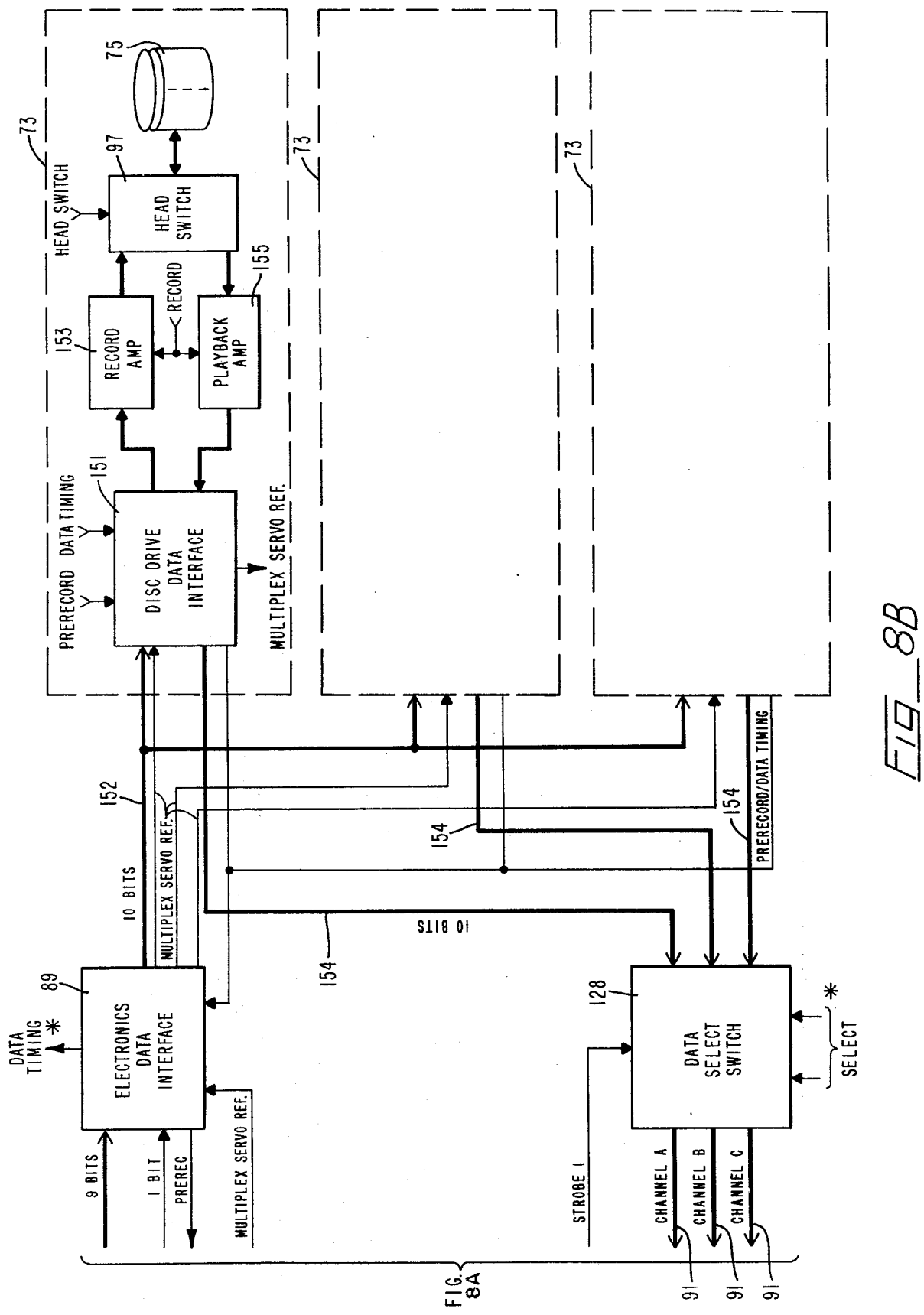

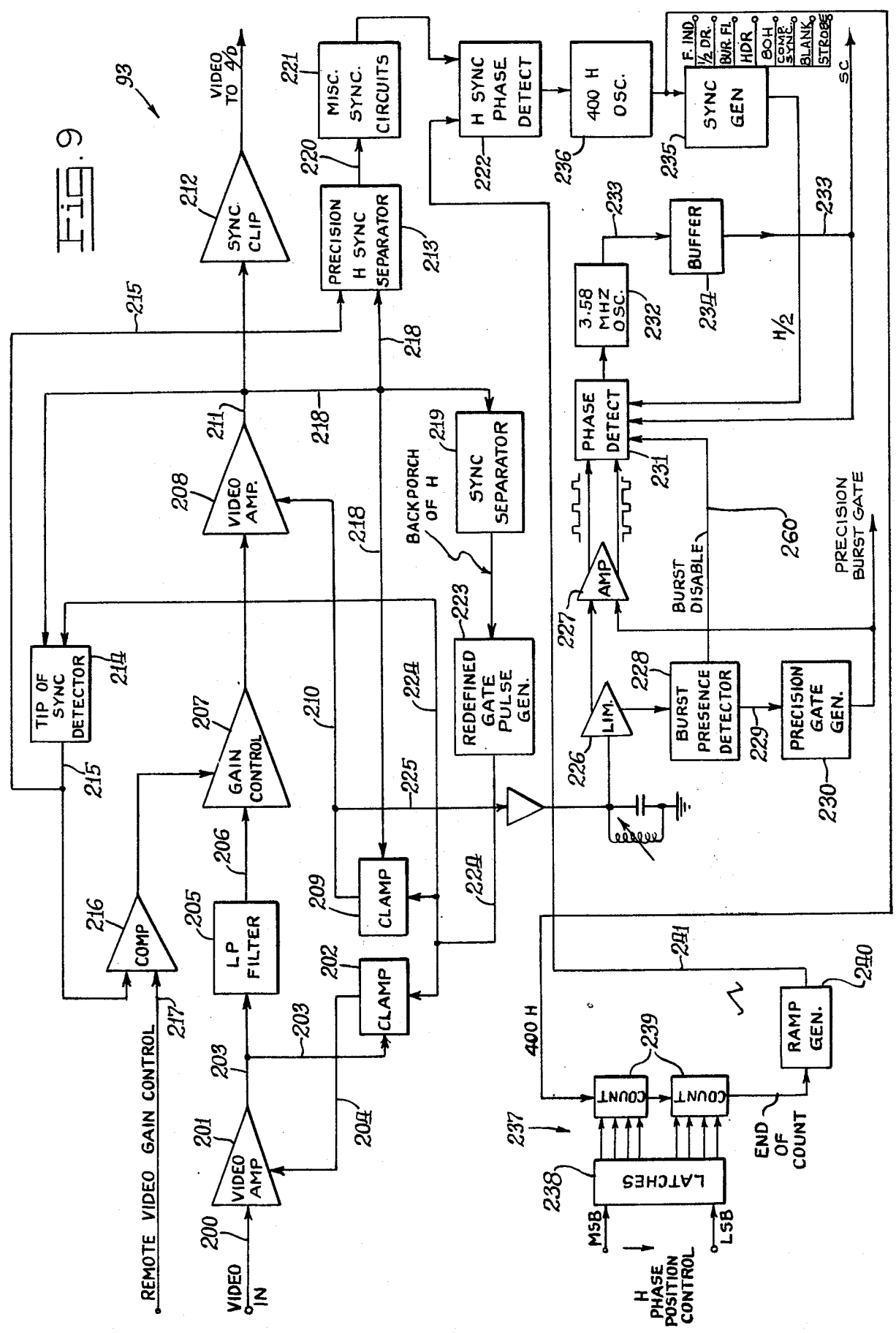

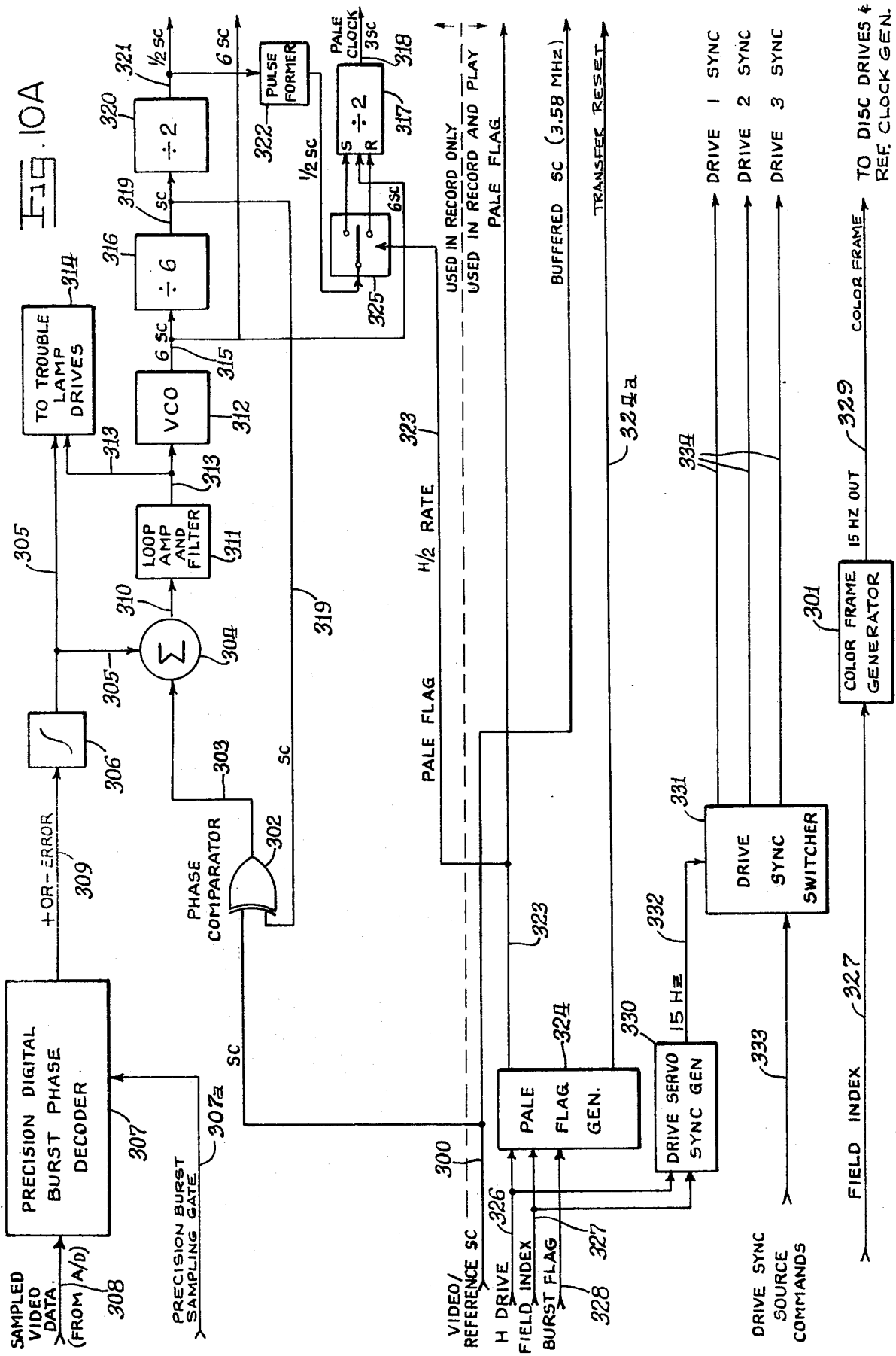

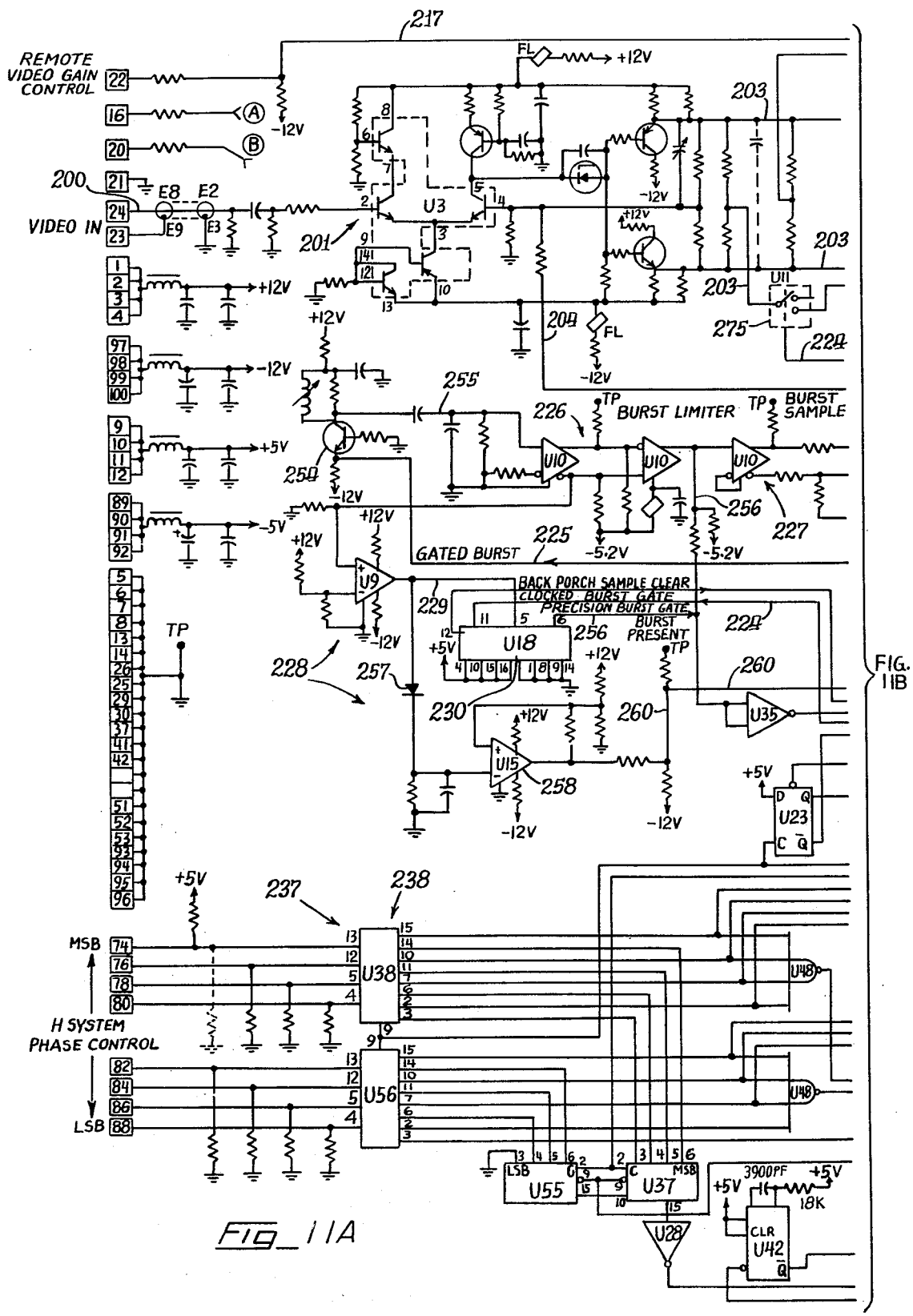
FIG_11A

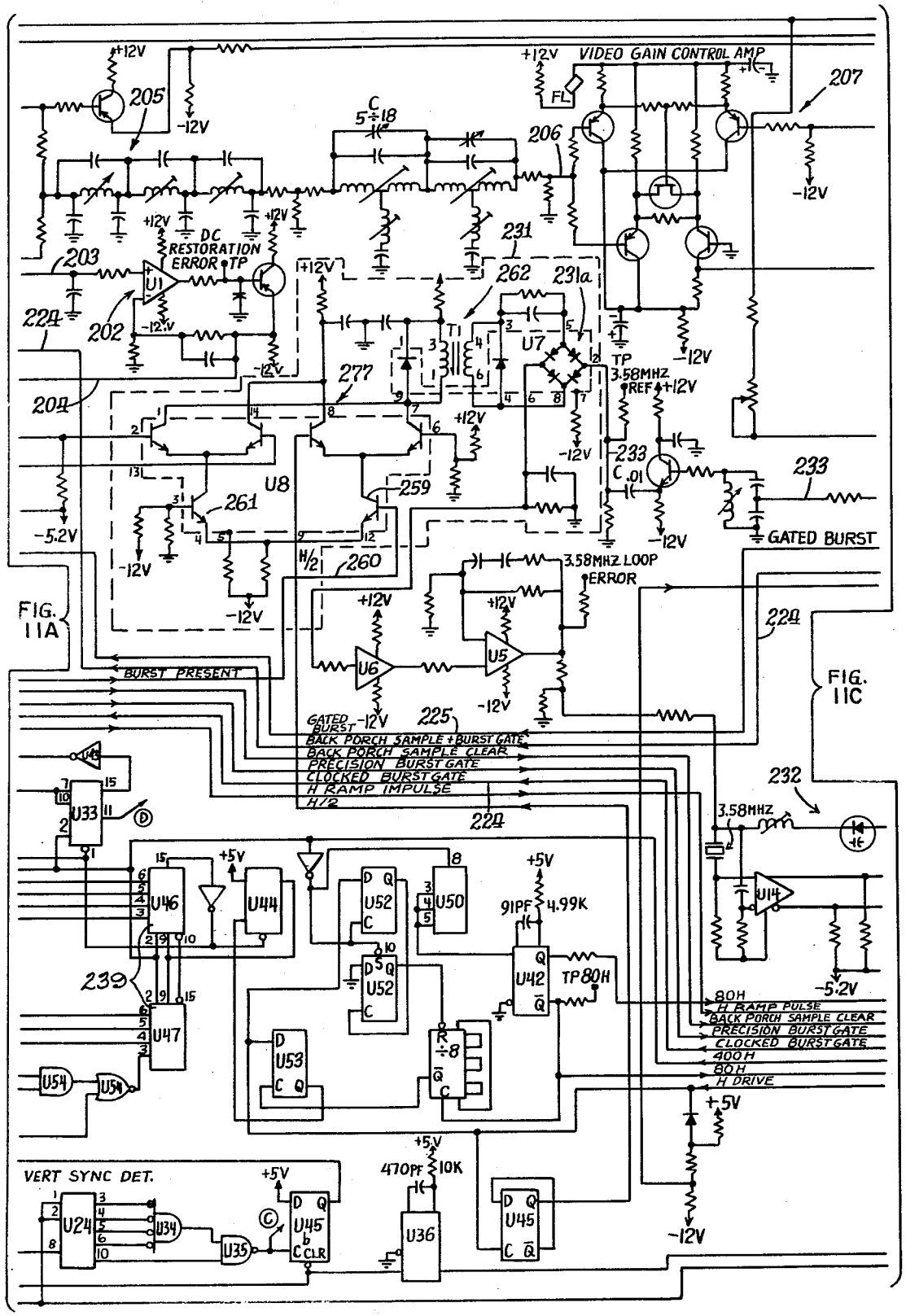

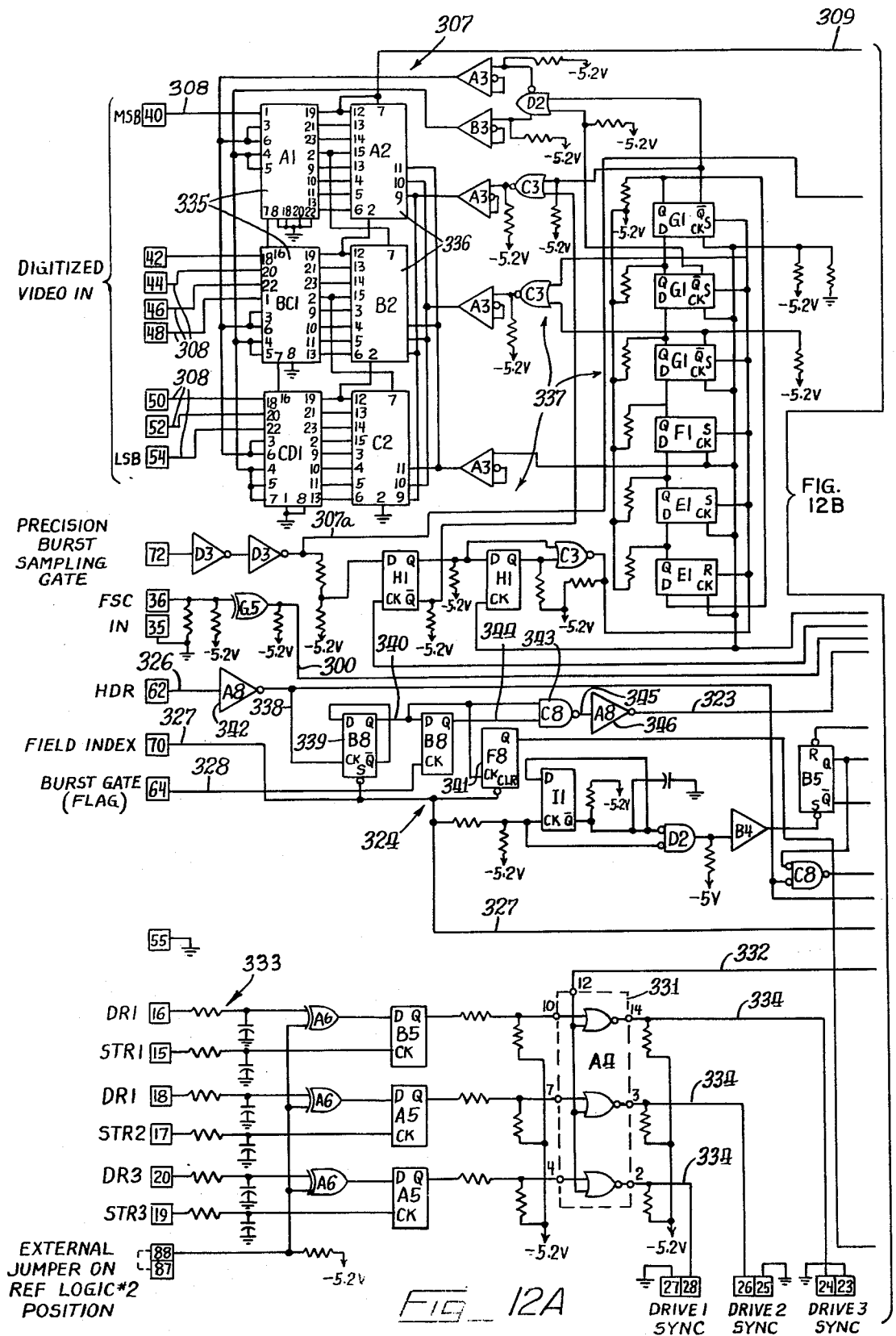

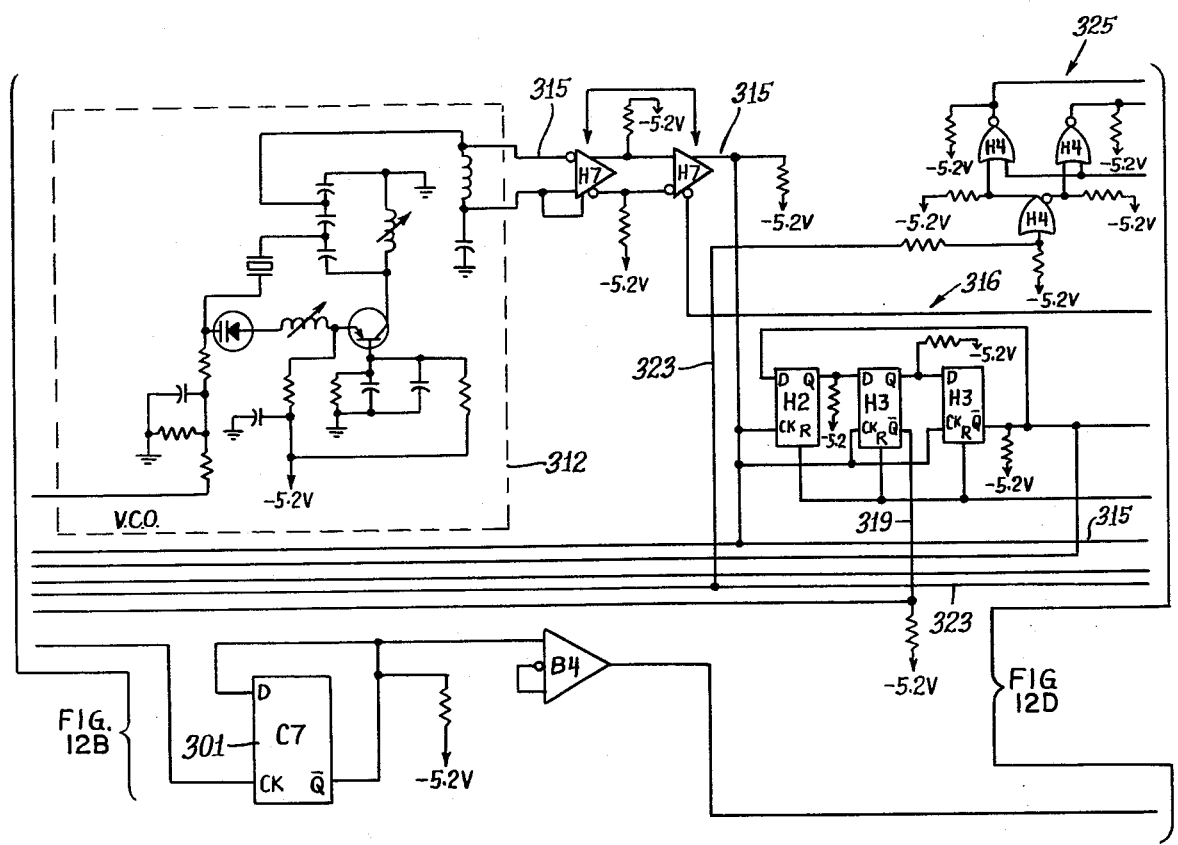
FIG_12C

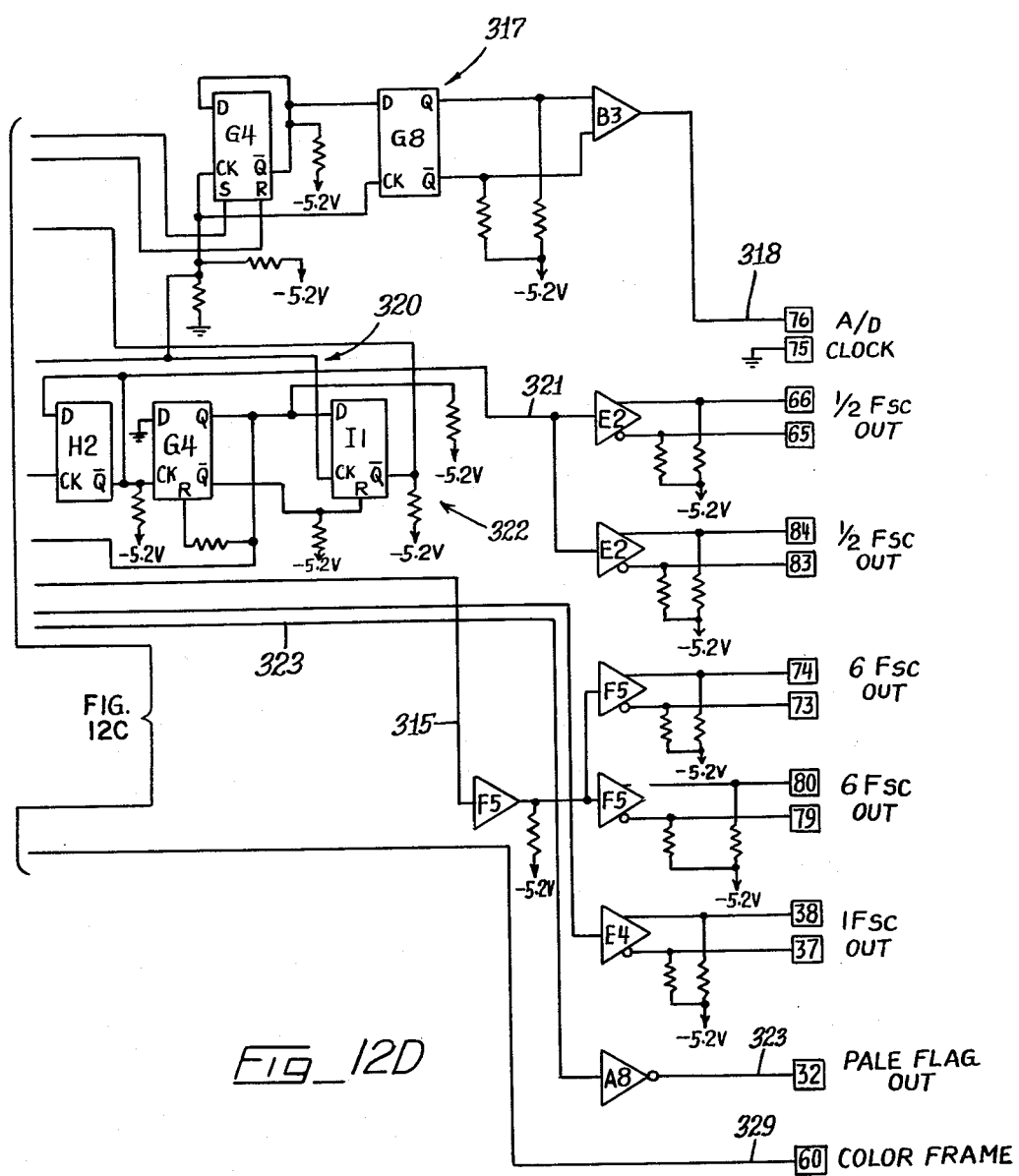

PRECISION PHASE CONTROLLED CLOCK FOR SAMPLING TELEVISION SIGNALS

CROSS REFERENCE TO RELATED APPLICATIONS

VIDEO FRAME STORAGE RECORDING AND REPRODUCING APPARATUS, Ser. No. 763,371, filed Jan. 28, 1977, by Joachim P. Diermann and Thomas W. Ritchey, Jr.

PLAYBACK APPARATUS ASSIGNMENT MEANS, Ser. No. 763,462, filed Jan. 28, 1977, by Howard W. Knight and Edwin W. Engberg.

TELEVISION SIGNAL DISC DRIVE RECORDER, Ser. No. 763,795, filed Jan. 28, 1977, by Howard W. Knight and Edwin W. Engberg.

DISC DRIVE RECORDING PROTECTION APPARATUS, Ser. No. 763,761, filed Jan. 28, 1977, by Edwin W. Engberg.

TELEVISION SUBCARRIER PHASE CORRECTION FOR COLOR FIELD SEQUENCING, Ser. No. 763,942, filed Jan. 28, 1977 by Luigi C. Gallo.

METHOD AND APPARATUS FOR PROVIDING DC RESTORATION Ser. No. 763,461, filed Jan. 28, 1977, by Luigi C. Gallo.

METHOD AND APPARATUS FOR INSERTING SYNCHRONIZING WORDS IN DIGITIZED TELEVISION SIGNAL DATA STREAM, Ser. No. 763,463, filed Jan. 28, 1977, by Luigi C. Gallo.

DIGITAL TELEVISION SIGNAL PROCESSING SYSTEM, Ser. No. 763,941, filed Jan. 28, 1977, by Luigi C. Gallo.

CLOCK SIGNAL GENERATOR PROVIDING NONSYMMETRICAL ALTERNATING PHASE INTERVALS, Ser. No. 763,792, filed Jan. 28, 1977, by Daniel A. Beaulier and Luigi C. Gallo.

PHASE LOCK LOOP FOR DATA DECODER CLOCK GENERATOR, Ser. No. 763,793, filed Jan. 28, 1977, by Kenneth Louth and Luigi C. Gallo.

A CIRCUIT FOR DIGITALLY ENCODING AN ANALOG TELEVISION SIGNAL, Ser. No. 762,901, filed Jan. 26, 1977, by Daniel A. Beaulier.

HIGH BIT RATE DATA ENCODER FOR DATA TRANSMISSION SYSTEM, Ser. No. 763,762, filed Jan. 28, 1977, by Luigi C. Gallo.

DATA RATE AND TIME BASE CORRECTOR, Ser. No. 763,794, filed Jan. 28, 1977, by Luigi C. Gallo.

A DIGITAL CHROMINANCE SEPARATING AND PROCESSING SYSTEM AND METHOD, Ser. No. 763,251, filed Jan. 26, 1977, by Robert P. MacKenzie.

FREQUENCY RESPONSE EQUALIZER, Ser. No. 762,902, filed Jan. 26, 1977, by Jerry W. Miller and Luigi C. Gallo.

A CIRCUIT FOR GENERATING A DIGITAL DELETED DATA, BLINKING CROSS SIGNAL WHICH IS STORED IN A DELETED TRACK AND SELECTIVELY DISPLAYED FOR DETECTION, Ser. No. 762,903, filed Jan. 26, 1977, by Luigi C. Gallo and Junaid Skeikh.

BACKGROUND AND FIELD OF THE INVENTION

The present invention generally relates to recording and reproducing apparatus and, more particularly, to apparatus that is adapted to record and reproduce television signals, using digital techniques.

The continued advances in technology have resulted in many changes in the equipment that is currently being used in television broadcast stations. One of the more recent changes that has evolved is the shift away from photographic techniques toward the use of magnetic media in many phases of the operation of the commercial broadcast television station. For example, feature films being broadcast often originate from magnetic tape rather than film and television station news departments are increasingly converting to videotape recording systems rather than using film cameras to provide the visual coverage of the news stories. Moreover, many systems utilize travelling transmitters that can either broadcast on location coverage or transmit such coverage to the station which can either be broadcast "live" or videotaped, edited and broadcast at a later time. Some of the many benefits of these techniques are the ease of handling, flexibility and speed of processing compared to the use of photographic film, coupled with the ability to reuse the magnetic tape when the information that is recorded on them is no longer needed.

One of the last remaining film domains in the present day commercial television broadcasting station is the Telecine island which uses 35 millimeter film transparencies. The Telecine island is used to provide video still images that are used during programming, commercials, news and the like, i.e., wherever a still image may be used during operation. Their use is extensive as is evidenced by the fact that the average commercial broadcast television station maintains a total file on the order of about 2000 to 5000 35 millimeter transparency slides. The maintenance of the total file represents a laborious operation which requires introduction of new slides, the discarding of obsolete slides and the maintenance of an accurate index so that they can be readily obtained when needed. When slide program sequences are to be assembled, they must be manually carried to the Telecine island, cleaned and manually loaded. Even with the cleaning operation, dust particles and scratches and the like may easily result in an unsatisfactory end product even when the projectionist is careful. Morever, following their use during broadcasting, the slides must be removed and returned to the file. The entire assembling, use and refiling of the slides represent a substantial labor investment because of the many manual operations that are required. The Telecine operation is considered to be one of the most antiquated operations in many modern broadcast stations and is basically incompatible with a fully automated station operation.

In contrast to the Telecine island or the use of opaque graphic material as the source for generating video still images, the apparatus described herein facilitates the use of a recording and playback apparatus that will record and reproduce still images, with the still image video information being stored on magnetic media. The magnetic recording and playback apparatus utilizes generally standard computer disc drives (though modified in some respects) as the magnetic storage media and thereby eliminates the many problems that are associated with slide transparencies. Since the still images are recorded on magnetic media, the problems of physical degradation during use, e.g., dust particles and scratches, are not experienced. Moreover, since the recorded information can be easily accessed, the same still image may be used by operators at different locations almost simultaneously.

As will be hereinafter described in detail, in the present invention the video information signal is sampled at a rate that is a multiple of the subcarrier frequency so that a number of samples are taken during each cycle of subcarrier. In the illustrated embodiment, the apparatus which is controlled by a sampling clock samples the video information signal at a rate of three times the subcarrier frequency so that three samples are taken for each cycle of subcarrier, i.e., at the 0°, 120° and 240° phase locations or positions. Since for a color video information signal, the phase of the samples relative to subcarrier determines the hue of the video image upon reproducing, it should be understood that sampling the information signal at other than the precise phase positions will ultimately produce inferior color reproduction.

The apparatus of the present invention insures that the samples are taken precisely at the phase locations that are desired so that the color will be accurate upon subsequent reproducing. The apparatus utilizes a phase locked loop to provide sampling reasonably close to the preferred sample locations, i.e., within about 20° of each of the desired sample locations of 0°, 120° and 240° in the illustrated embodiment. The actual samples are then examined to determine if phase error does in fact exist and adjusts the sampling clock so that the samples are taken precisely at the 0°, 120° and 240° phase positions. This effectively corrects any errors that may be produced due to temperature drifting and the like.

OBJECTS OF THE INVENTION

Accordingly, it is an object of the present invention to provide an improved apparatus for reliably sampling an information signal having an associated carrier signal so that the sampling occurs at precise phase positions relative to said carrier signal.

It is another object of the present invention to provide the sampling apparatus of the above type which examines the actual samples to determine if any variance exists between the actual phase locations of the samples and the desired phase locations and to thereby adjust the sampling to substantially eliminate such variances.

Other objects and advantages will become apparent upon reading the following detailed description in conjunction with the attached drawings.

DESCRIPTION OF THE DRAWINGS

FIG. 4 is a broad functional and simplified block diagram of the entire apparatus of the present invention;

FIG. 5A illustrates a portion of a typical television signal illustrating the vertical internal thereof;

FIG. 5B illustrates a portion of a color television signal, particularly illustrating the horizontal synchronization pulse and color burst signal;

FIG. 6 is a functional block diagram broadly illustrating the signal flow path through the apparatus during a record operation;

FIG. 7 is a functional block diagram broadly illustrating the signal flow path through the apparatus during a playback operation;

FIGS. 8A and 8B together comprise a block diagram illustrating the signal system for the apparatus of the present invention, including control interconnections between the various blocks;

FIG. 9 is a functional block diagram of the video input circuitry (substantially similar to the reference input circuitry) which is a portion of the signal system shown in FIG. 8A;

FIG. 10A is a functional block diagram of the reference logic circuitry which is a portion of the signal system shown in FIG. 8A;

FIG. 10B is a timing diagram for the PALE Flag generator included in the reference logic circuitry shown in FIG. 10A.

FIGS. 11A, 11B, 11C and 11D together comprise an electrical schematic diagram of the input circuitry of the signal system shown in the block diagram of FIG. 9;

FIGS. 12A, 12B, 12C and 12D together comprise an electrical schematic diagram of the reference logic circuitry of the signal system shown in the block diagram of FIG. 10A;

Referring to FIGS. 1–3, a recording and reproducing apparatus is illustrated, indicated generally at 70 in FIG. 1 which includes two bays 71 and 72 containing electrical circuitry associated with the apparatus, together with the various monitoring and control hardware shown specifically in the upper portion of the bay 72. The system also includes a pair of disc drives 73 located adjacent the rightward bay 72 with each of the disc drives 73 having a disc pack 75 mounted thereon. While two disc drive units are specifically illustrated in FIG. 1, it should be understood that there may be additional disc drives used with the system to increase the on-line storage capacity of the apparatus. It should also be appreciated that a single disc drive may be used. Operational control of the apparatus is performed by one or more operators using either one of many remote access stations, such as the remote access station 76 shown in FIG. 2, or an internal access station 78 which is located in the bay 72. If desired, a video monitor 79, vector and "A" oscilloscopes 80 may be provided as shown in bay 72. Phase control switches 81 are provided above the internal access station 78.

Figure 1:
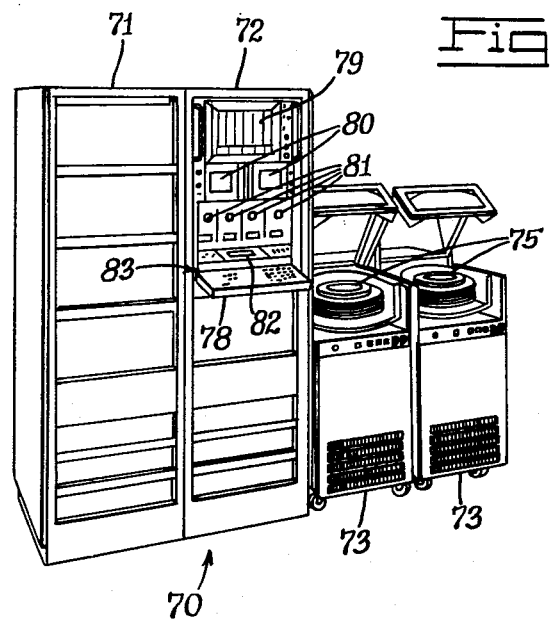
FIG. 1 is a perspective view of the apparatus embodying the present invention, illustrating its overall appearance, including the internal access station and two disc drive units.
Figure 2:
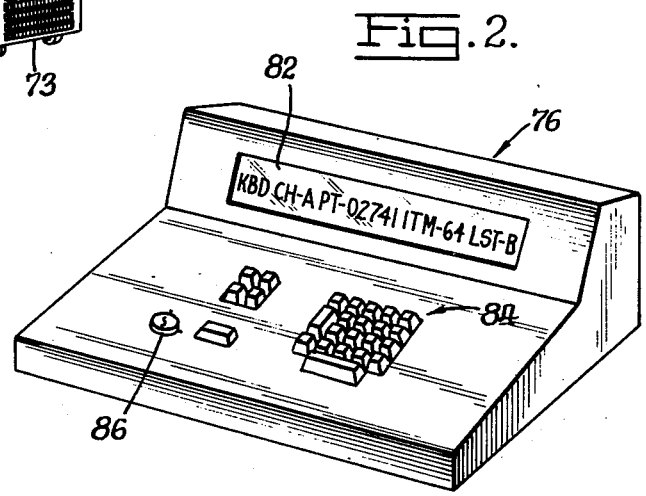
FIG. 2 is an enlarged perspective view illustrating a representative remote access station that an operator can use to control the operation of the apparatus of the present invention.
Figure 3:
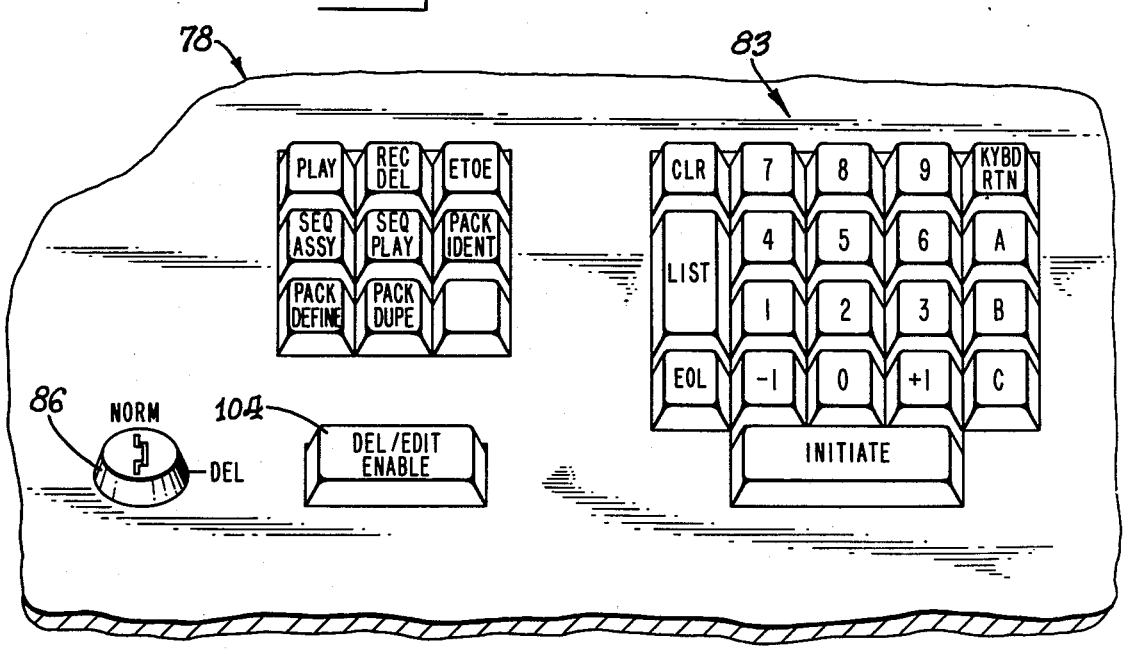
FIG. 3 is an enlarged top view of a portion of the internal access station keyboard shown in FIG. 1 particularly illustrating the various keys and bars that an operator uses during operation.

The apparatus is controlled by an operator using either the internal access station 78 or a remote access station 76, both types of which have a keyboard with numerical and function keys and bars, a 32 character display 82, which provides a readout of information that is needed to carry out functional operations during use, as well as to display the information concerning the identity of certain stills being addressed and other information. It should be understood that the remote access station 76 shown in FIG. 2 is representative of each of the remote access stations and that in the preferred embodiment, up to seven remote access stations can be used to control the apparatus 70. The internal access station keyboard indicated generally at 83 in FIG. 1, as shown in the enlarged fragmentary view in FIG. 3, has more expanded operational capability than the remote access stations, whose keyboards have fewer function keys. As will be explained in detail hereinafter, the keyboard contains a large cluster of keys indicated generally at 84 and a smaller cluster of function keys 85 located on the left side of the keyboard. Additionally, a turn key controlled switch 86 may be provided to switch between normal and delete operations to safeguard against the possibility of inadvertent or unauthorized erasure of actively used stills.

Referring to the very simplified block diagram shown in FIG. 4, the apparatus receives a video input signal which is processed by record signal processing circuitry 88 and is then applied to record signal splitter circuitry 89 which directs the signal to all of the disc drives 73. Gating circuitry located within a selected disc drive 73 is enabled to allow the signal to be recorded on a selected drive. More than one disc drive 73 can be simultaneously selected for recording the video signal provided by the record signal splitter circuitry 89. Switcher circuitry can be substituted for the signal splitter and associated gate circuitry so that the signal provided by the record signal processing circuitry 89 is coupled only to selected disc drives having the disc packs 75 upon which the signal is to be recorded. During playback, a signal originating from one of the disc drives is applied to the playback switching circuitry 90 which directs it to one of the playback channels 91, each of which provides a video output channel. A computer control system 92 is interfaced with the record processing circuitry, signal splitting and switching circuitry and disc drives for controlling the overall operation of the various components of the apparatus and also interfaces the remote access stations and internal access station. The circuit details of the computer control system 92 and of the access stations 76 and 78 for controlling the recording and reproducing apparatus 70 are described in the above-identified related application, Ser. No. 763,371. An operator can select a particular disc in which to store a still, provided that the disc pack is on-line, i.e., it is physically loaded on one of the disc drives 73. In this regard, it should be understood that the apparatus addresses disc packs rather than disc drives for the reason that the apparatus is adapted to identify up to 64 separate disc packs, only one of which can be located on a disc drive at any one time. Thus, in the event the apparatus has two disc drives, only two disc packs can be on-line at one time. The operator can use an access station keyboard 83 to enter the address of a disc pack upon which he wishes to record a still and, through the interaction of the computer with the disc drive on which the selected disc pack is loaded, can carry out the recording operation on the selected on-line disc pack. Similarly, an operator can play back a still frame from the disc pack on one of the disc drives and can define the playback channel that he wishes the still frame to be played through.

The apparatus has four major operating modes or conditions, i.e., (1) record/delete, (2) playback or reproduce, (3) sequence assembly and (4) sequence play. The record and play operations will be initially described, while referring to FIGS. 6 and 7 which illustrate somewhat simplified block diagrams of the signal flow paths during recording and playback, respectively, with respect to one of the disc drives 73.

Turning first to the record signal flow block diagram of FIG. 6, the composite video input signal is applied to the input stage circuitry 93 where clamping of the signal takes place and the synchronization and subcarrier components are stripped from the composite video signal. The input stage also regenerates the synchronization (hereafter often referred to as merely "sync") and subcarrier signals for later use during reproduction and, accordingly, the regenerated sync and subcarrier signals are directed to a clock generator 94 which also generates reference signals that are used by the downstream elements during operation. The clamped analog video signal with the color burst component is then applied to an analog-to-digital converter (A/D) 95 which provides an output signal at a sample rate of 10.7 megasamples per second, with each of the samples comprising 8 bits of information. The digital video signal is a non-return to zero code (NRZ) which means that it is a binary code defining a ONE as a high level and a ZERO as an equivalent low level. The digitized video signal appears on 8 parallel lines, i.e., one bit per line, which is applied to an encoder and sync word inserter 96 which converts the digitized video into a special recording code (referred to herein as a Miller code or a Miller squared code) that is particularly suitable for digital magnetic recording in that it minimizes DC content of a data stream. The circuitry also inserts a synchronizing word on alternate television lines with respect to a particular phase angle of the color subcarrier as represented by the color burst sync component. The sync word is used as a reference for correcting time base and skewing errors that occur during playback among the eight parallel bits of data that must be combined to define the value represented by each sample. The digital video information in the eight parallel lines is then applied to a recording amplifier circuitry 153 and head switch circuitry 97 associated with the selected disc drive 73 which switches between two groups of eight recording heads for recording the digitized video signal by the disc drive. The disc drive is servo controlled so that its spindle rotational speed is locked to vertical sync, with the rotational disc speed being 3600 revolutions per minute. By locking the spindle drive to vertical sync, the apparatus records one television field per revolution of the disc pack and simultaneously records the eight data streams on eight disc surfaces. At the completion of recording one field, the recording amplifier circuitry 153 and head switch circuitry 97 is commanded to activate another set of heads for simultaneously recording the second field of a television frame on another set of eight disc surfaces so that a full television frame is recorded on two revolutions of the disc drive, using 16 heads. Each disc pack located on a disc drive preferably contains 815 cylinders, each of which has 19 recording surfaces and can therefore store 815 digital television frames. There is one read/write head for each of the 19 disc recording surfaces of a disc pack and all heads are mounted vertically aligned on a common carriage whose position is controlled by a linear motor. It should be understood that a cylinder is defined to comprise all recording surfaces that are located on the same radius of a disc pack. However, the term track, rather than cylinder, is preferred herein and, accordingly, a track is meant to include all recording surfaces on a same radius, i.e., all surfaces on a cylinder. Thus, an addressed track for recording or playing back a still actually refers to the 19 individual surfaces on the cylinder available at that radius. Of the 19 surfaces that are available for recording, one is used to record the address and other housekeeping information, rather than active video information, and it is specifically referred to as the "data track". Two of the 19 surfaces are available for recording a parity bit and 16 surfaces are used to record the video data as will be explained further hereinbelow. Also one of the heads, generally referred to as the servo head, travels on the 20th disc pack surface that contains only servo track information prerecorded by the pack manufacturer. The servo tracks carry out two functions, i.e., following a seek command the head stack traverses servo tracks that are counted to determine the instantaneous location of the heads and, after completion of a seek phase, the servo head generates an error signal that is used to control the linear motor position to hold the head carriage centered on the appropriate servo track. By using such a feedback system, it is possible to achieve a radial packing density of about 400 tracks per inch or a total of 815 tracks per disc pack.

Since the present apparatus does not record analog video signals because of frequency response limitations of disc pack memories, the video signal is digitized for recording. Because the digitized signal is recorded, the video signal to noise ratio of the system is primarily determined by quantization noise rather than recording media and preamplifier noise as is the case with conventional videotape recorders. Thus, the present apparatus delivers a signal to noise ratio of about 58 dB and effects such as moire and residual time base error do not exist, the digital random error of the storage channels being typically low enough to make occasional transmission errors virtually invisible.

By recording a digital data stream at a rate of 10.7 megabits per second on each of the eight disc surfaces, the linear packing density of the apparatus is about 6000 bits per inch which is about 60% greater than is used in conventional disc drive usage in data processing.

During playback and referring to FIG. 7, the heads read, i.e., reproduce the digital video information from the eight surfaces per field and obtain the recorded channel encoded digital video signal. The reproduced signal is applied to a playback amplifier circuitry 155 and head switch circuitry 97 associated with the selected disc drive 73 which amplifies the data streams of digital video information carried by the eight data bit lines and applies the same to equalizer and data detector circuits 99. The equalizer compensates for phase and amplitude distortion introduced to the signal by the band limiting effects of the record and reproduce processes and insures that the zero crossings of the reproduced signal are distinct and accurately positioned. Following equalization, the channel encoded signals in each data bit line are processed for transmission to the playback circuitry of the signal system over a twisted pair line. The processed channel encoded signals are in the form of a pulse for each zero crossing or signal state transition of the channel encoded signal. The twisted pair lines for the eight data bits of the digital video information apply the processed channel encoded signals to the decoder and time base corrector circuitry 100 of one or more of the playback channels 91 of the apparatus. The decoder and time base corrector circuitry 100 reprocesses the received signals to place them in the channel encoded format, decodes the signal to the non-return to zero digital form and time base corrects the digital signal with respect to station reference to remove inter-data bit line time displacement errors (commonly referred to as skew errors) and timing distortion within each of the data streams carried by the data bit lines. Thus, the time base corrector portion of the circuitry 100 serves to align the eight bits defining a single sample and remove timing distortion in each of the data bit lines relative to station reference. It should be realized that each playback channel 91 is provided with decoder and time base corrector circuitry 100 and within each playback channel each of the eight data bit streams travels through a separate decoder and time base corrector. The output of the circuitry 100 is then applied to a comb filter and chroma inverter circuitry 101 which separates the chroma information and selectively inverts and recombines the signal for reconstruction of a four field NTSC sequence. This reconstructed digital signal is applied to a digital-to-analog converter 102 which provides an analog video signal. The new sync and burst are then added by a process amplifier 103 to produce a composite video analog output signal of the playback channel 91 as is desired.

While the signal flow paths for both the recording and playback operations have been briefly and broadly described, the signal processing system for the composite television signal is much more detailed than is shown by the signal flow diagrams contained in FIGS. 6 and 7. The video signal system will now be described in greater detail in conjunction with the block diagram illustrated by FIGS. 8A and 8B which contains additional blocks than previously identified. However, the reference numbers previously identified will remain where corresponding functions are performed. The block diagram of FIGS. 8A and 8B also includes wider lines representing the video data flow through the signal system as well as other interconnecting lines that are necessary for controlling the timing and synchronization of the circuitry represented by the various blocks. The input and output lines from the various blocks in FIGS. 8A and 8B which have an asterisk adjacent to them are lines which extend to the computer control system 92.

It should also be understood that the apparatus of the present invention will be described herein with respect to use in an NTSC system which has a television field comprised of 525 lines, horizontal synchronizing pulses occurring at a rate of about 15,734 Hz (often referred to herein as "H sync") which means that the period between successive H pulses is approximately 63.5 microseconds. Moreover, the vertical blanking rate in the NTSC system occurs at a 60 Hz frequency and the chrominance information is modulated on a subcarrier signal having a frequency of about 3.58 megahertz (MHz). The subcarrier frequency of 3.58 MHz will often be referred to herein simply as SC which means 1 times the subcarrier frequency and, similarly, other commonly used clocking frequencies in the described apparatus include ½SC, 3SC and 6SC. The 3 times subcarrier frequency (3SC) often occurs for the reason that during sampling of the analog composite video signal for digitizing the signal, a sampling rate of 3 times the subcarrier frequency, i.e., 10.7 MHz is used.

Referring again to FIG. 8A, but before discussing the functions of each of the blocks shown therein, some broad general considerations should be understood with respect to the overall operation of the illustrated signal system. Firstly, the video input signal that is fed to the video input circuitry 93A is an analog signal which is processed and applied to an analog-to-digital converter 95. The output of the converter contains the video information in digital format and the digitized data is further processed and recorded on a disc pack in a digital format. Similarly, it is played back from the disc pack, time base corrected and chroma separated and processed using digital techniques and is not converted to an analog signal until one of the final steps where the digital-to-analog converter and sync and burst insertion circuitry provides the analog composite video output as shown.

In the analog-to-digital converter 95, the analog composite video signal is sampled three times per nominal subcarrier cycle, or at a sampling rate of 3SC (10.7 MHz), and each sample is digitally quantized into an 8 bit digital word. A sampling clock having a frequency of three times or any odd multiple of the NTSC subcarrier frequency is necessarily an odd multiple of one-half of the horizontal line frequency. If such a sampling clock is phase continuous from line to line, its phase at the start of consecutive lines changes. Using such line to line phase continuous sampling clocks will result in the instantaneous amplitude of the analog signal being sampled during consecutive lines at different times relative to the start of the consecutive lines. Because of this, the quantized samples are not in vertical alignment from line to line. Vertical alignment of the samples from line to line is desired to facilitate the use of a digital comb filter to obtain a separated chrominance component of a television signal by combining quantized samples from three consecutive (all odd or all even fields) television lines of a television field, which may be designated T (for top), M (for middle), and B (for bottom) in proportion to the formulae (Chrominance) $C = M - \frac{1}{2}(T + B)$ (Luminance) $Y = M + \frac{1}{2}(T + B)$.

It should be appreciated that if the samples of the NTSC television signal are taken at an even multiple of the subcarrier frequency, the comb filtering technique would be ideal because the phase of the sampling clock would not change from line to line. Hence, the digital code words or quantized samples would describe the instantaneous amplitudes of each line of the analog signal at the same times relative to the start of each line and all of the samples in the consecutive lines would be aligned vertically from top to middle to bottom.

Figure 8C:
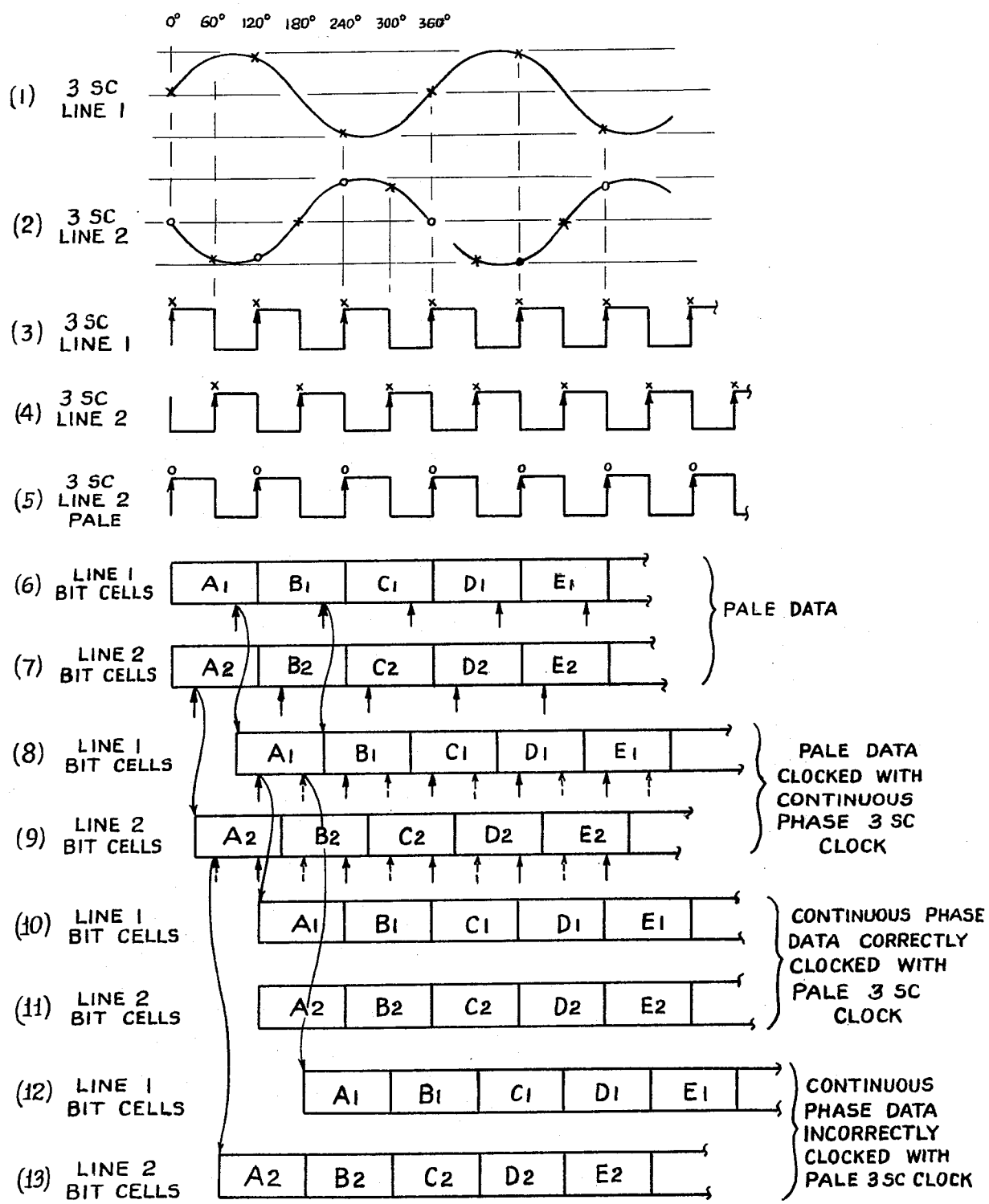
FIG. 8C is a timing diagram illustrating sampling of a television signal and phase relationships that occur at different locations of the signal system.

The lack of vertical alignment of the samples of consecutive lines when using a 3SC, line to line phase continuous sampling clock can be more readily appreciated with reference to FIG. 8C(1) which shows a number of cycles of subcarrier in television line 1 that are sampled by the positive transition of a 3SC sample clock (FIG. 8C(3)) wherein the upward transition has an arrow depicting an "X" sample point that is also placed on the subcarrier for television line 1 at every sample point (FIG. 8C(1)). As shown, there are three samples for each cycle of the subcarrier. However, during television line 2, i.e., the next consecutive line, the subcarrier has a reversed phase as shown in FIG. 8C(2) and similarly, the sampling clock 3SC is of opposite phase (FIG. 8C(4)) relative to its phase in line 1 (FIG. 8C(3)) so that during television line 2 the samples are taken where shown by the X's of the television line 2 subcarrier (FIG. 8C(2)) on the upward transitions and it is seen that the X samples from line 1 to line 2 are misplaced by 60° with reference to SC, which detrimentally affects the response of the comb filter, which utilizes the instantaneous amplitude of the analog signal in the above mentioned equations for properly deriving the chrominance information. It should be appreciated that the samples taken on all odd lines will be vertically aligned and that the samples taken on all even lines will be vertically aligned but that the samples taken on even lines will be displaced 60° with reference to SC relative to those samples on the odd lines.

To avoid the problem created by sampling at an odd multiple of subcarrier frequency, i.e., 3SC in the present apparatus described herein, vertical alignments of samples in all lines can be achieved by changing the phase of the sampling clock on alternate lines. In the examples shown in FIG. 8C, reference is made to FIG. 8C(5) which illustrates the 3SC sampling clock for television line 2 which has its phase reversed relative to what it would have been for television line 2, which is shown in FIG. 8C(4). By sampling on the upward transitions at the "O" sample points, samples marked by the "O" on the subcarrier for line 2 result as shown in FIG. 8C(2). Thus, the sample points in the subcarrier for television line 1 ("X'S") are vertically aligned relative to the sample points ("O's") that are sampled using the alternated phase sample clock shown in FIG. 8C(5) rather than what would have normally occurred as shown by FIG. 8C(4). This technique is commonly referred to as phase alternate line encoding or PALE and the terms PALEd, PALEing and the like will commonly be referred to throughout the description of the apparatus described herein.

While the apparatus described herein utilizes comb filtering techniques together with a sampling rate of 3SC or 10.7 MHz and requires the use of a PALE sampling clock, it should be appreciated that a 4SC sampling frequency would eliminate the need for PALEing. The use of a 4SC sampling frequency is within the contemplation of the apparatus described herein in the event that the frequency response of the recording media, i.e., the disc packs on the disc drives is sufficient to permit operation at the 4SC, 14.3 MHz frequency. In this regard, it is to be appreciated that standard disc drives used in data processing applications typically operate in the range of about 6-½ megabits and the recording at a rate of 10.7 megabits represents a significant increase in the packing density of the disc packs themselves.

Another important aspect of the operation of the present apparatus that is a result of the use of PALEing will also be described with respect to FIG. 8C. By changing the phase of the sampling clock on every consecutive line, a phase discontinuity necessarily occurs with respect to SC. It is more convenient during the channel encoding of the signal for use in subsequent recording to channel encode the digitally quantized samples with respect to a continuous phase clock, i.e., no phase discontinuities from line to line. For this reason during recording, the PALEd data that results at the output of the analog-to-digital converter 95 is clocked out of the channel encoder 96 with a clock that has a continuous (i.e., no discontinuities) 3SC phase from line to line. However, clocking the encoder with a line to line continuous phase clock shifts the data in time on alternate lines by one-half cycle of 3SC, which disturbs the line to line sample time alignment created by sampling with a PALE clock. Since during playback the chroma processing circuitry requires the samples of data to be vertically aligned from line to line, which was the reason that a PALE sample clock was used in the analog-to-digital converter in the first place, it is necessary to retime or reclock the data from the continuous phase clock back to the PALE clock so that the sample time disturbance is removed and the chroma processing comb filter can process the data without error. Succinctly stated, the A/D converter 95 samples the analog signal using a PALE clock having line to line phase discontinuities. For recording, the channel encoder 96 encodes the PALE data with a line to line continuous phase clock, which requires, during playback and after decoding, the retiming of the NRZ information to a PALE clock for use by the chroma processing circuitry. However, the latter retiming from a continuous to a PALE clock is not performed during transfer modes of operation when the video data recorded on one disc drive memory is played back to be transferred and recorded on another disc drive memory. In such cases, the line to line continuous phase data clocking of the played back video data is retained and the data is rerecorded without disturbing the data clocking.

The above considerations will now be described in conjunction with FIG. 8C where the PALE data for lines 1 and 2 are shown in FIGS. 8C(6) and 8C(7), respectively. The bits A1 through E1 are consecutive bit cells that represent the instantaneous samples of the analog video signal that occur in line 1 corresponding to the X's shown in FIG. 8C(1), with each bit cell lasting a full clock cycle of the 3SC clock shown in FIG. 8C(3). Similarly, the line 2 bit cells A2 through E2 represent data that is derived by the sampling at the "O's" in FIG. 8C(2) using the PALE sample clock, which for television line 2 is shown in FIG. 8C(5). To clock the PALE data with a line to line continuous phase 3SC clock, arrows beneath the bit cells shown in FIGS. 8C(6) and 8C(7) depict the clocking points of the line to line continuous phase clock that produce the bit cells that are shifted and are in the relation shown in FIGS. 8C(8) and 8C(9). The start of each bit cell occurs at the clocking point and the level of the cell will be continuous through the bit cell interval so that the bit cells maintain their identity during the clocking.

To retime the data from the line to line continuous phase clock back to PALE clock so that the bit cells (samples) are vertically aligned as they should be, i.e., A2 is vertically aligned with A1, B2 with B1, etc., the retiming from the continuous phase clock to the PALE clock must be correctly done or misalignment of the bit cells will result. In this regard, the retiming or reclocking must be complementary, i.e., a bit cell that was clocked in the right portion thereof in a PALE-to-continuous reclocking must be left clocked in the continuous-to-PALE reclocking to insure proper playback. Thus, given the line to line continuous phase clocked data shown in FIGS. 8C(8) and 8C(9), the solid arrows illustrate the proper complementary clocking for the two television lines and produce the retiming of the data to the PALE clock having the A1 and A2 bits vertically aligned as shown in FIGS. 8C(10) and 8C(11). It should be noted that where bit cells that were right clocked going from PALE-to-continuous reclocking, are left clocked in the opposite conversion as is evident from viewing any of the bit cells, e.g., A1, with their associated clocking arrows in FIGS. 8C(6) and 8C(8). In the event that complementary clocking is not performed, then the bits will not be properly aligned as is shown by the dotted clocking arrows in FIGS. 8C(8) and 8C(9) which produce the relationship shown in FIGS. 8C(12) and 8C(13). The reclocking from either PALE to continuous or the converse is performed at various locations as will be evident from the ensuing description.

It should also be realized that the NTSC television signal does not have any specified, defined relationship between the horizontal sync pulse occurring at each line and the phase angle of the subcarrier signal with the exception that the phase of the subcarrier changes 180° from line to line. In other words, the phase angle of the subcarrier signal relative to the H sync signal can vary from one video source to another and this variance makes the H sync an undesirable signal to control the operation of the apparatus. Accordingly, the apparatus herein uses the input signal's subcarrier as represented by the color burst sync component as the basic timing reference for the system and defines a new H sync related signal that is used for timing purposes instead of the signal's H sync. The new H sync related signal is chosen to be at a frequency of one-half of the nominal horizontal line frequency because it represents a whole number of cycles of the subcarrier frequency, i.e., two complete horizontal lines of subcarrier frequency or 455 cycles. Moreover, the H sync related signal is given a definite relation to the subcarrier, i.e., it is synchronized with respect to the phase angle of the subcarrier. In the record portion of the signal system a synchronizing word is inserted in the video signal on alternate television lines at a location corresponding approximately to that of the video signal's H sync and phase coherent with respect to a particular phase angle of SC generated from the video signal color burst subcarrier synchronizing component. The location of the new H sync related signal is defined at the beginning of each frame and is maintained for the duration of the frame to provide the video signal with an H sync related signal accurately and consistently defined with respect to the phase of the video signal's subcarrier. For the playback portion of the signal system, an H sync related signal designated H/2 is provided that is redefined to be coherent with respect to a particular phase angle of the reference input subcarrier, which phase angle is selectable through the playback system phase control.

The redefined H sync related signal, H/2, is used as a basic timing reference signal for the system during playback operations.

By using the redefined H sync related signal as the horizontal sync reference for the system, processing signals for recording, playback and other operations of the system is facilitated because a consistent time relationship is established between the video signal's subcarrier and redefined H sync related signal.

Additionally, the use of internal horizontal and subcarrier reference signals that can be varied in time relative to the television station reference sync, permits timing control that will enable the television signal to reach a remote location at the proper time after having experienced the usual propagation delays that occur.

Referring again to the block diagram of FIGS. 8A and 8B, the analog video input is applied to the input of input circuitry 93A where several operations occur in the processing of the analog video signal before it is applied to the analog-to-digital converter 95. More specifically, the input circuitry 93A amplifies the analog video signal, provides DC restoration, separates the sync components contained in the video signal for use in generating timing signals for the signal system, detects the level of the tip of the H sync and thereafter clips the same. Moreover, the H sync is separated using a precision sync circuit for use in producing a regenerated sync. The circuit also produces a regenerated SC signal that is derived from the burst of the video input or, in the absence of burst, from an H/2 reference signal that is generated and is derived from the video input H sync.

It should be understood that the video input circuitry 93A and the reference input circuitry 93B shown in the lower left of FIG. 8A perform similar functions, the video input circuitry primarily for the signal recording portion of the signal system and reference input circuitry primarily for the playback portion of the signal system. Therefore, for convenience of manufacturing and service, identical circuitry is used. However, the input circuits are connected in the apparatus to receive only the input signals required to perform their respective functions and while the same signals are produced by each circuit, they are not all utilized from each circuit. The reference input to the reference input circuitry is the station reference color black video signal which contains all components of a color television signal except that the active video portion of it is at a black level. Thus, the burst, H sync and the like are present at the reference input circuitry 93B as they are at the video input circuitry 93A. In addition, the reference input circuitry 93B uses an H phase position adjusting circuit that receives H position control signals from an operator controlled thumb wheel switch or the like, such as phase control switches 81, for adjusting the H phase position of the regenerated H sync used in the playback portion of the signal system.

As shown, many of the output signals provided by the input circuits 93A and 93B are applied to the reference logic circuits 125A and 125B associated with the respective input circuits. The reference logic circuit 125A during the record mode of operation uses the inputs from the video input circuitry 93A, the analog-to-digital converter 95 and the computer control system 92 and through precision phase lock loop circuitry, generates a number of recording clocks at frequencies of 6SC, 3SC, ½SC and a PALE flag signal. The PALE flag and 3SC signals are used by the reference logic circuit 125A to generate a 3SC PALE sampling clock signal whose phase is set for each line of the video signal by the PALE flag, which is at a frequency of H/2. The PALE flag signal changes state at that rate although it does so asymmetrically, i.e., the two states of the PALE flag signal are of unequal time intervals. It is made asymmetrical so that the sampling clock phase for the color burst portion of the video signal is constant with the phase of the subcarrier and only the portion of the television line thereafter has a sampling phase which is alternated on consecutive lines. This PALE clock is coupled to the analog-to-digital converter 95 and is the sampling clock signal for deriving the samples at 3SC or 10.6 MHz.

The reference logic circuit 125B uses inputs from the reference input circuitry 93B and the computer control system 92 and generates a clock reference signal at a frequency of SC and various other timing control signals. These signals are used in the operation of the apparatus in modes other than that of recording input video signals.

During the record and playback modes of operation, the reference logic circuits also generate servo sync signals for each of the disc drives for properly operating the disc drives at the proper phase.

During playback and other modes of operation other than that of recording input video signals, a reference clock generator 98 generates various clocks and additional timing control signals required by various parts of the signal system used in such modes. The reference clock generator uses the inputs from reference input circuitry 93B, reference logic 125B, the playback portion of the signal system, an operator's control switch and generates clock signals at frequencies of 6SC, 3SC, SC and ½SC and various other timing control signals. The reference logic circuitry 125A and 125B and the reference clock generator circuitry 98 together comprise the signal system's clock generator 94 that provides the system timing control signals.

The clamped and H sync stripped analog video signal from the video input board is applied to the analog-to-digital converter 95 which converts the signal to an 8 bit binary coded signal in a PALEd NRZ (non-return to zero) format which is applied to the encoder switch 126. The analog-to-digital converter 95 is not shown in detail herein as it is identical in its design and operation to the one incorporated in the Ampex Corporation digital time base corrector No. TBC-800. More specifically, the schematic diagrams of the analog-to-digital converter 95 are shown in the catalog No. 7896382-02 issued October 1975. The specific circuitry for the analog-to-digital converter is shown in schematic drawing No. 1374256 appearing on page 3-37/36 of the catalog. These schematics are incorporated by reference herein.

The output from the analog-to-digital converter is then fed to an encoder switch 126 which comprises switching circuitry that ordinarily receives either the 8 bit digitized video data from the converter or from data transfer circuitry 129. The data transfer circuitry 129 enables the video information to be transferred from one disc drive to another disc drive. During the transfer mode of operation, the digitized information is read off of the disc drive, decoded to the NRZ digital format, time base corrected and is then applied to the encoder switch which can select either source of digitized video information of the encoder 96. Because the channel encoded data recorded on the disc drives 73 has been clocked with a continuous phase clock, the NRZ data received by the data transfer circuitry 129 also is timed with respect to the continuous phase clock. Ordinarily, the data transfer circuitry 129 is provided with a PALE flag signal that is used to effect retiming of the NRZ digital data with respect to a PALE clock signal so that the data provided to the chroma separator and processing circuitry 101 is in the correct PALEd format. During the transfer mode of operation, this retiming is not necessary. The encoder switch 126 has circuitry for interrupting the coupling of the PALE flag signal to the data transfer circuitry 129 and thereby preventing the retiming of the NRZ data with respect to the PALE clock during the data transfer mode.

The encoder switch 126 is controlled by the computer control system 92 to gate the video data from either the video or transfer paths. It also switches between video and reference 6SC and ½SC timing signals since the reference timing signals are used during the data transfer mode and the video timing signals during the record mode. The encoder switch is also adapted to generate a signal that will produce a blinking cross through the TV image which is a visual indication that the still location or address for a still is unoccupied and therefore available for recording and also to provide signals for performing diagnostic functions.

The 8 bit data from the encoder switch 126 is then applied to the encoder 96 which initially generates a parity bit and then encodes the PALEd data into a Miller squared channel code format, which is a self-clocking, DC free, non-return to zero type of code. While PALEd data is applied to the encoder, the output of the encoder is a 9 bit data stream (if parity is included) that has a phase continuity with respect to 3SC. The continuous phase clocked data is easier to process, particularly, during the decoding operations. The DC free code avoids any possible DC component that could occur due to a preponderance of one logical state over a period of time which could have an effect of disturbing the data in the playback process. Reference is made to the U.S. Pat. by Jerry Wayne Miller No. 4,027,335, entitled "DC Free Encoding For Data Transmission System".

As is comprehensively described therein, the coded format can be characterized as a DC free, self-clocking, nonreturn to zero format. It provides for transmitting binary data over an information channel of limited bandwidth and signal to noise, where the data is transmitted in selfclocking format that is DC free.

In limited bandwidth information channels which do not transmit DC, binary waveforms suffer distortions of zero crossing location which cannot be removed by means of linear response compensation networks. These distortions are commonly referred to as base line wander and act to reduce the effective signal to noise ratio and modify the zero crossings of the signals and thus degrade the bit reliability of the decoded signals. A common transmission format or channel data code that is utilized in recording and reproducing systems is disclosed in Miller U.S. Pat. No. 3,108,261. In the Miller code, logical 1's are represented by signal transitions at a particular location, i.e., at mid-cell, and logical 0's are represented by signal transitions at a particular earlier location, i.e., near the leading edge of the bit cell. The Miller format involves the suppression of any transition occurring at the beginning of 1 bit interval following an interval containing a transition at its center. Asymmetry of the waveform generated by these rules can introduce DC into the coded signal and the so-called Miller "squared" code used in the present apparatus effectively eliminates the DC content of the original Miller format and does so without requiring either large memory or the necessity of a rate change in the encoding and decoding.

The encoder circuitry 96 also generates a unique sync word in the form of a 7 digit binary number and inserts the sync word on alternate lines in a precise location determined by the 6SC and ½SC clock signals. In the record mode of operation, clock signals generated from the synchronizing components of the input video signal by the reference logic circuitry 125A are provided to the encoder circuitry 96 by the encoder switch 126 and result in the sync word being inserted at a location that approximately corresponds to where the video signal's horizontal sync pulse was previously located. In other modes of operation, the 6SC and ½SC clock signals are generated from the synchronizing components of the station reference color black video signal by the cooperative action of the reference logic circuitry 125B and reference clock generator 98. The encoder gates the H sync related sync word into the data stream on alternate television lines at the proper time relative to the regenerated subcarrier phase.

Data track information to be recorded on the data track of the disc drives 73 is also encoded by the encoder 96 prior to recording. The data track information is provided by the computer control system 92.

With reference to FIG. 8B, the ten data streams of encoded digital data appearing at the output of the encoder 96 is applied to the record signal splitter 89 which is merely signal splitting and buffering circuitry which couples the encoded data to the three disc drives 73 for selective recording on a disc pack 75. Each disc drive includes a disc drive interface 151 adapted to receive the encoded digital data from the record signal splitter 89 and send it to the record amplifier circuitry 153 and head switch circuitry 97 for recording on an associated disc pack 75 as well as to receive reproduced or detected data from the playback amplifier circuitry 155 and head switch circuitry 97 and send it to the data select switch 128. In addition, the disc drive interface 151 receives the multiplex servo reference signal through the record signal splitter and sends it to the timing generator of the disc drive control circuitry. This signal is selected by the computer control system 92 from either reference logic circuitry 125A or 125B. The timing generator employs the multiplex servo reference signal to time the operation of the disc drive system so that record and playback operations and the rotational position of the disc pack 75 within the disc drive 73 are synchronized to the appropriate signal system timing reference. As explained hereinbefore, standard computer disc drives are used in the recording and reproducing apparatus 70, although modified slightly to adapt them to the particular operations required of the apparatus. The details of the disc drives 73 as arranged for use in the recording and reproducing apparatus 70 are described in he above-identified related application, Ser. No. 763,371.

The disc drive control circuitry returns prerecord timing and data timing signals through the disc drive data interface 151 to the record signal splitter 89 of the signal system. In the particular embodiment of the apparatus described herein, only two fields of the four field NTSC color television signal color code sequence are recorded, with each of the two fields recorded during separate revolutions of the disc pack 75. Immediately prior to the recording of the two fields of video data, the pre-record timing signal is generated and coupled to the record signal splitter 89. The splitter sends the pre-record timing signal to the encoder 96 to cause the generation for an interval equivalent to two fields data equivalent to color black, which is digitally defined by logical 0's in the apparatus described herein. The two field interval of color black data is returned through the splitter and data interface for recording on the disc pack at the track location selected for recording video data and its associated data track information. The recording of the two fields of color black data occurs during two revolutions of the disc pack 75 immediately preceding the two revolutions during which the two fields of video data are to be recorded. This conditions the track location for the subsequent over recording of the video and data track data. Because over recording previously recorded digital data with new digital data can be conducted to obliterate the previously recorded digital data and leave a recorded signal of sufficient quality to provide an acceptable signal to noise ratio upon playback, the pre-recorded cycle of operation could be eliminated from the apparatus and the recording of the two fields of video data and associated data track data accommplished in only two revolutions of the disc pack 75.

The data timing signal is returned to the record signal splitter 89 to time the generation and recording of the data track information during the second or last field of the two fields of video data. The signal is a pulse which begins after the vertical sync occurring between the two fields of video data and terminates at the end of the second field. It is during this interval that the data track information is recorded on the data track of the disc pack 75. The record signal splitter 89 couples the returned data timing signal to the computer control system 92 for identifying the data track recording interval to the system. In response, the computer control system 92 performs functions incident to the recording of data track information, including the provision to the signal system of the data track information associated with recording video data on a specified track of a specified disc pack. The encoder 96 receives the data track information and processes it for sending to the disc drive 73 and recording simultaneously with the last field of video data.

The record and playback amplifier circuitry 153 and 155, the head switch circuitry 97, and the disc drive control circuitry of the apparatus described herein are arranged together so that the playback amplifier circuitry 155 and head switch circuitry 97 are activated to reproduce data from the associated disc pack 75 at all times except when a record operation is being performed. Hence, except during record operations, reproduced data is always being received by the disc drive interface 151, which in turn always provides the reproduced data to the data select switch 128. To record data, a record command provided by the disc drive control circuitry is coupled to the record and playback amplifier circuitry 153 and 155 to activate the record amplifier circuitry 153 and disable the playback amplifier circuitry 155. The disc drive control circuitry also provides a 30 Hz head switch signal to the head switch circuitry 97 during record operations to cause the head switch circuitry to couple the data streams to one set of heads during the first field of two consecutive fields of data to be recorded and to the second set of heads during the second field. The 30 Hz head switch signal is continuously available and is similarly employed during playback operations to control the head switch circuitry 97 to switch the playback amplifier circuitry 155 between the two sets of heads for the reproduction of both fields of a desired video data signal.

Returning to FIG. 8A, during playback operations, the reference input circuitry 93B together with the reference logic 125B produces the regenerated subcarrier frequency for application to the reference clock generator 98 and the reference clock generator has outputs of 6SC, ¼SC and H/2 for providing the basic timing for playback operations. The reference clock generator outputs are applied to the data decoder and time base corrector 100, data transfer circuitry 129 and the chroma separator and processor 101 in addition to a video playback output circuit 127 that inserts blanking, performs selective bit muting, and provides a selected monochrome video signal for output by the signal systems when the heads associated with a disc drive coupled to the playback channel are moved between track locations. The 8 bits of digital information are then applied to the digital-to-analog converter and sync and burst insertion circuitry 102 and 103. Moreover, during the transfer and diagnostic modes of operation, the reference clock generator 98 supplies the basic timing clocks for the encoder 96 through the encoder switch 126 are shown.

During playback, the 10 bit parallel data stream comprising 8 bits of video data, the parity bit and data from the data track reproduced from a disc pack is amplified, equalized and detected and is then applied through the disc drive data interface circuitry 151 to a data select switch 128 which can switch any of the outputs of the three disc drives onto one or more of three channels. Thus, the data select switch can switch the information from disc drive No. 1 into channel A, or to two channels while simultaneously applying a data stream from another disc drive onto another channel. While information from two drives can not be simultaneously applied to a single channel, the converse is possible. The data select switch 128 comprises conventional switching circuits which are not set forth in details herein.

Each of the detected nine bit streams of video data and parity data from the select switch 128 is then applied to nine individual data decoders and time base correctors 110 which decode the data and then independently time base correct each of the nine data streams with respect to a common H/2 reference which is defined with respect to the phase of the regenerated reference subcarrier to remove any timing errors that may be present among the nine lines of data, i.e., it aligns all sync words so that each 9 bit parallel byte comprises the correct 9 bits of data. The other bit stream from the data track is coupled by the data select switch 128 to only the decoder portion of the decoder and time base corrector circuitry 100 and the decoded data track information is coupled to the CPU 106. The time base corrector does its correction using a continuous phase clock. However, the data is again retimed with respect to a PALE clock by the data transfer circuitry 129, i.e., the phase of the signal is alternated by reclocking it at every horizontal line, so that the 8 bit data stream that comes from the data transfer circuitry is a true PALEd signal again. The data transfer circuitry 129 also performs a parity check of the off disc data and performs error masking of individual byte errors when they occur by substituting what is likely to be the most similar previously appearing byte for the byte that was detected as being in error. In this regard, the byte that is substituted is the third previous byte, which is the most recent sample that was taken with the same phase relation to SC.

The output of the data transfer circuitry is applied to the chroma separator and processing circuitry 101 in the event that the video information is desired for viewing, as opposed to being recorded on another disc drive (transfer), in which case the data from the data transfer circuitry 129 is coupled to the encoder switch 126. The chroma separation and processing circuitry 101 works in the digital domain and separates the chroma information from the luminance using comb filter techniques and inverts the chroma information on alternate frames to form a four field composite NTSC signal that is then applied to the video playback output circuitry 127 which inserts a reference black level during the blanking period, inserts grey level signals during the interval between the playback of consecutive stills, and performs bit muting operations if desired. The bit muting effectively mutes any bit or bits of an 8 bit television signal by shutting down that data bit stream and by so doing, achieves unusual visual effects in the resulting television signal such as producing exaggerated tones, ghostlike images and the like. The output from the blanking insertion and bit muting circuitry 127 is then applied to the digital-to-analog converter 102. The digital-to-analog converter receives clock signals from the playback output circuitry 127 and converts the data to its analog form and also inserts the sync and burst components of the signal to produce a full composite analog television signal. The details of the portion of the signal system for processing the video signals reproduced from a disc pack 75 are described in the above-identified related application Ser. No. 763,371.

The video input and reference input circuitry 93A and 93B broadly described with respect to the block diagram of FIG. 8A contain substantially similar circuitry in both locations, although different inputs are received by each and all of the outputs that are available from each are not used. During record operations, the composite video input signal to be recorded is applied to the video input circuitry 93A which is used to obtain a regenerated subcarrier signal, and various vertical and horizontal sync rate related signals that are used by the apparatus in the performance of the record operations. The video input circuitry also provides an amplified and filtered video signal suitable for feeding the A/D converter 95. During playback operations, a reference color black video signal is applied to the reference input circuitry 93B which provides similar signals for use by the apparatus in the performance of the playback operations.

Referring more specifically to the block diagram for the video and reference input circuits shown in FIG. 9, the video signal is applied on line 200 into a video amplifier 201 which amplifies the signal and restores the DC component through a clamp 202. The clamp 202 samples the output of the amplifier on line 203 and produces a DC component on line 204 that extends to the amplifier 201. The DC restored video signal on line 203 is then passed through a low pass filter 205, the output of which appears on line 206 extending to a video gain control amplifier 207. The amplifier 207 is connected to another video amplifier 208 where a second clamp circuit 209 assures that the blanking level of the signal is at ground level by the application of a DC control signal via the line 210 to the video amplifier 208. The output of the video amplifier appears on line 211 and is coupled by one of the lines 218 extending therefrom to the sampling input of the clamp 209. Line 211 also extends to a gated sync clipping circuit 212 as well as to a precision sync separator 213. A tip of sync detector 214 detects the level of the tip of sync which appears on line 215 that extends to a comparator 216 as well as to the precision sync separator 213. In the video input circuitry 93A, a remote video gain control signal on line 217 is also applied to the comparator 216 for controlling the gain control amplifier 207 from a remote location. In the reference input circuitry 93B, the gain of amplifier 207 is not controlled from a remote location. The output of the tip of sync detector 214, which may contain alternating current ripple, is applied to one input of the precision H sync separator 213 while the other input to the separator is provided by one of lines 218 that extends from the output of the video amplifier 208. The two inputs to the precision sync separator 213 will both have AC ripple thereon if present in the signal and, accordingly, they are common moded so that the separator produces an AC ripple free precision separated sync on line 220 that is applied to miscellaneous sync circuits 221 and to an input of a horizontal sync phase detector 222. Another of the lines 218 from the output of the video amplifier 208 extends to a less precise sync separator 219 that produces a generally less precise separated sync signal which is applied to a gate pulse generator 233, outputs of which appear on lines 224 that extend to both clamps 202 and 209 as well as to the tip of sync detector 214. When the horizontal sync signal is detected and separated, a gate is produced by the pulse generator 223 which closes the clamps as well as the sync tip detector at the appropriate time during horizontal blanking.

The clamp 209 is closed during burst time for a whole, integral number of cycles, rather than an arbitrary period, so that the blanking level of the video signal can be accurately obtained using integration techniques as will now be described in detail. The burst appears on line 210 as well as on line 225 which is applied to a burst limiter circuit 226 that is in turn connected to an amplifier 227 providing complementary outputs of the limited burst input. The output of the limiter circuit 226 is also connected to a burst presence detector circuit 228 having an output on line 229 that extends to a precision gate generator 230 as well as an output on line 260 that extends to a phase detector 231. When the presence of burst is detected, the precision gate generator 230 generates a precision burst gate signal that is coupled to enable the amplifier 227 and permit it to pass the middle three cycles of burst to apply them to the phase detector 231. The phase detector responsively provides an error signal to a voltage controlled oscillator 232 that reflects the difference in phase between the output of the oscillator and the phase of the burst cycles from the amplifier 227. The effect of the phase detector circuit controlling the oscillator 232 is to correct for longer term changes and not short term changes in the phase of the three cycles of burst that are used on every line as the subcarrier reference. The output of the oscillator 232 appears on line 233 after having been buffered by a buffer 234. The output of the oscillator is a continuous regenerated subcarrier signal SC (3.58 MHz) that is phase locked to the color burst when burst is present. However, in the event that the burst detector circuit 228 fails to detect burst, then the phase detector 231 compares the phase of an H/2 signal with the regenerated subcarrier output of the oscillator 232, the H/2 signal being produced by a sync generator 235 from an oscillator 236 that is controlled by the horizontal sync phase detector 222.

A horizontal phase position control, indicated generally at 237, is provided for use in the reference input circuitry 93B to adjust the horizontal positioning of the regenerated sync. A 8 bit binary number is loaded into latches 238 by an operator controlled thumb wheel switch or the like, for example, control switches 81 located by the internal access station 78 (FIG. 1), to preset a counter 239 which is clocked by a 400H clock derived from the oscillator 236. When the counter reaches its terminal count, it triggers a ramp generator 240 having an output 241 which extends to a second input of the H sync phase detector 222. Thus, by adjusting the latches, up to plus or minus 20 microseconds can be inserted in the feedback loop on line 241 and the phase of the regenerated sync signal can be adjusted for horizontal positioning of the picture during playback. Since a delay in the feedback loop means that the regenerated sync will be advanced, the horizontal position control can effectively advance the picture to compensate for propagation delays during transmission of a signal through cabling in a television station. This horizontal phase position control is operated in conjunction with a subcarrier phase control operatively associated with the reference clock generator 98 whereby the amount of delays can be controlled in small increments, which in the embodiment of the apparatus described herein is about ± 0.8 nsec.

The output of the oscillator 236 also is used by the sync generator 235, which is of the conventional design for television signal processing equipment, to generate the various vertical and horizontal sync rate related signals indicated in FIG. 9. These sync rate related signals are generated with respect to the phase of the precisely regenerated H sync as provided by the phase detector 222 and, therefore, will always have a phase related to the input signal.

An important aspect of the circuitry shown in FIG. 9 is that the H sync of the video signal is clipped at precisely one-half its value and the level of the blanking is precisely clamped to ground. The regenerated subcarrier is phase locked with the burst and a precision horizontal sync signal is regenerated utilizing the precision sync separator. This signal is used by the sync generator 235 to provide a reset pulse (30 Hz field index pulse) for resetting a line identification or sync word inserter included in the encoder 96 (FIG. 9A). Since the clamp circuitry 209 examines for a zero average level of video at burst time using a clamping pulse which lasts precisely a whole number of cycles of burst, there is no need for low pass filtering the video and rejecting the burst before clamping is performed. This is due to the fact that resulting integration of the burst is equal to zero and there is no H/2 ripple introduced by integrating a signal that does not contain complete cycles of burst.

The block diagram shown in FIG. 9 describes the functional operation of the input circuitry and specific circuitry which can be used to carry out the operation thereof is shown in FIGS. 11A through 11D which together comprise a single circuit diagram for the input board.

With respect to the operation of the clamp 209 (see FIG. 11C), the voltage at the output of the amplifier 208 appears on lines 211 and 218, one of the latter of which extends downwardly to the base of an emitter follower transistor 244 that provides a voltage drop. Under equilibrium conditions, the blanking level of the video signal appearing on line 218 will be at ground potential. This signal is shifted by about 0.7V toward the negative as a result of the voltage drop through the emitter follower 244. A matching emitter follower transistor 245 with its emitter connected to the negative input of a differential amplifier 246 by line 247 shifts the comparison level (ground) toward the negative as does transistor 244. The emitter of the transistor 244 is connected to the positive input of the differential amplifier 246 when a transmission gate or switch 248 is closed during and for a whole number of cycles of burst by a signal on the line 224 that is produced by the redefined gate pulse generator 223 shown in FIG. 42D. Thus, during the burst time, switch 248 is closed charging a capacitor 249 to the average level of the burst. The switch is closed for an integral number of cycles of the subcarrier. This eliminates the need for low pass filtering the video to remove the burst before the clamping is performed, which is ordinarily done in the prior art in order to eliminate H/2 modulation of the clamping level. The charge on the capacitor 249 reflects exactly the average value of the burst and the differential amplifier 246 output represents an error that is applied to the video amplifier 208 through line 251, transistor 252 and line 210 which is connected to the emitter of the transistor 252. The blanking level of the signal on line 211 is thus held very close to ground due to the high DC gain of the differential amplifier 246. The operation of the clamp 202 is substantially similar to the operation of the clamp 209 and is shown in FIGS. 11A and 11B.

Figure 11C:
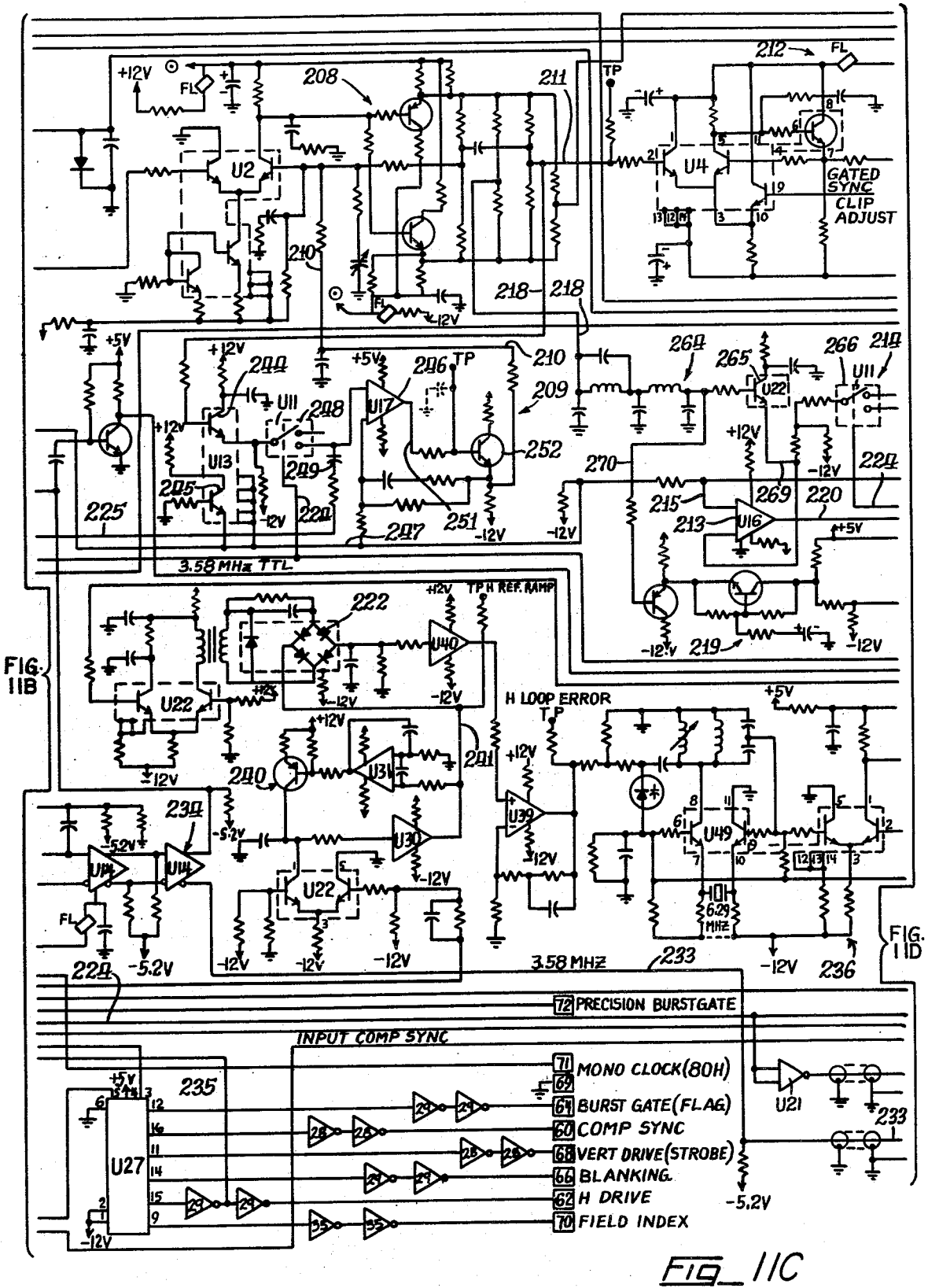
Figure 11D:
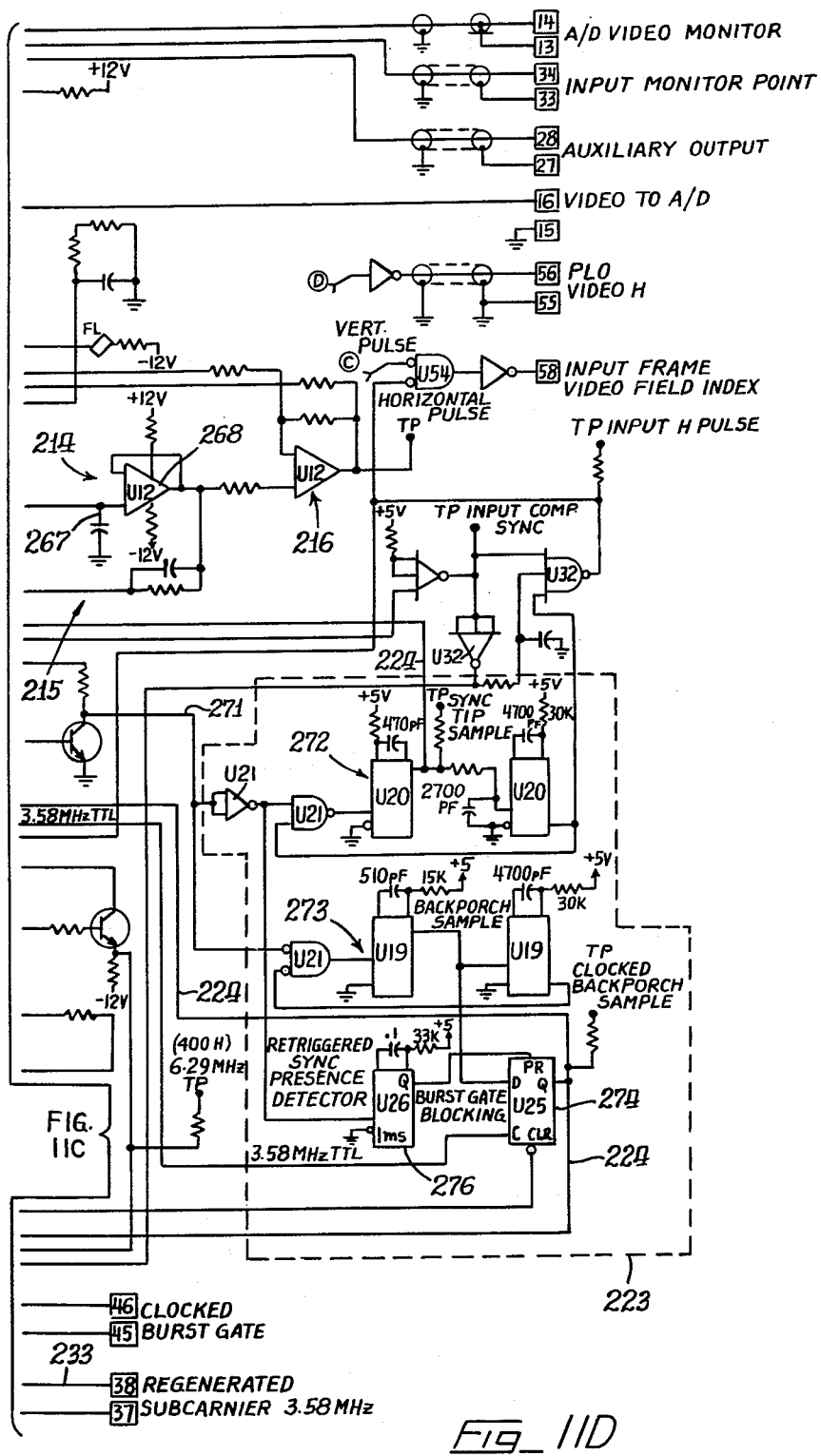
Figure 12B:
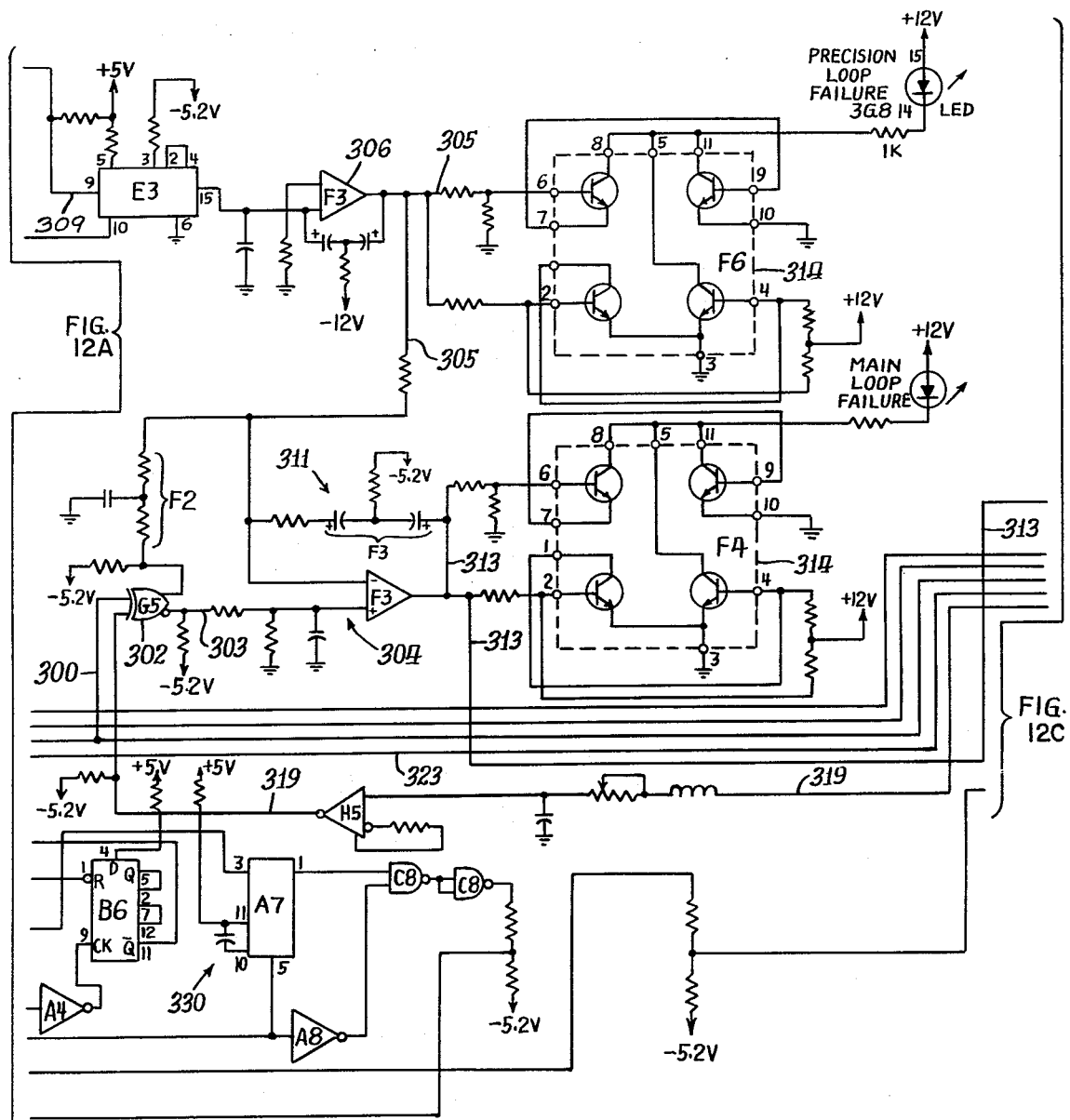

Referring again to FIG. 11C, the closing of the switch 248 gates burst through the switch into capacitor 249 and onto line 225 which extends leftwardly to FIG. 11A which is connected to the emitter of a transistor 254 and the burst therefore appears on the collector and on line 255 that extends to the burst limiter circuit 226. When burst is present, the burst presence detector circuit 228 provides a limited burst signal on its output line 229 that clocks the precision gate generator 230. A counter is employed as the precision gate generator and counts cycles of the limited burst signal and produces a precision burst gate during the middle three cycles of the nine to eleven cycle burst interval that is coupled by line 256 to enable the amplifier 227. Therefore, except for the middle three cycles of burst, the amplifier 227 is disabled by the output of the burst presence detector circuit 228. When burst is present, the diode detector 257 and following latch circuit 258 of the detector circuit 228 provides a more negative level on line 260 extending to a switching transistor 259 (FIG. 11B) of the phase detector 231. When burst is present, switching transistor 259 is shut off and another switching transistor 261 of the detector 231 is turned on. When transistor 261 in on, the three cycles of burst from the amplifier 227 is applied by the driver 277 to a transformer 262 of the detector 231. The driver is in turn connected to the phase comparator 231a for comparing the phase of the burst with the phase of the output of the 3.58 MHz (SC) oscillator 232 that is present on line 233. When burst is not detected by the detector circuit 238, transistor 259 is switched on, which applies the signal H/2 to the other input of the driver 277 that is also connected to the transformer 262 and the phase of the oscillator output on line 233 is compared with the phase of the H/2 signal.

Turning now to the detailed circuitry for performing the precision H sync separation and referring to FIG. 11C, the sync is taken from the amplifier 208 on the line 218 extending to a low pass filter 264 whose output is coupled to the base of a transistor 265. The emitter of transistor 265 is connected to a transmission gate or switch 266 that is closed during the presence of sync by control line 224. The level of the sync is determined by charging a following capacitor 267 (FIG. 11D), which is buffered by a unity gain amplifier 268, and one-half of the DC level of the tip of sync together with the full level of AC ripple present in the signal is then applied via line 215 to one input of sync separator 213, the other of which is supplied by line 269 that comes from the emitter follower transistor 265. In the embodiment of the input circuitry 93A and 93B illustrated in FIGS. 42A–D, the precision H sync separator 213 is a comparator. In this manner, the output on line 220 is a separated sync whose timing is not affected by AC ripple on the video, because any AC ripple will appear on both inputs of the comparator 213 and will be prevented from appearing in the output of the comparator because of common mode rejection. The sync appearing on line 220 is a precision sync that is used by other parts of the signal system to generate horizontal line related synchronizing signals redefined in relation to a particular phase angle of the subcarrier signal which serve as timing references in the signal system for processing the video signals. Also, the horizontal line related synchronizing signal used in the system is at a rate of 1/2H sync because there are a whole number of subcarrier cycles for every two horizontal lines (227.5 × 2 = 455) and this consideration becomes important in the operation of apparatus described herein as will be evident from the ensuing description.

A less precise separated sync is also developed by taking the sync from the low pass filter 264 via line 270 to the imprecise sync separator 219, the output of which appears on line 271 that is applied to the gate pulse generator 223 which includes a one shot serving as a sync presence detector 276. The upper circuit, indicated generally at 272, generates a gate for use by the switch 266 to close the switch during the presence of sync, a circuit 273 produces a backporch sample and a circuit 274 redefines with respect to SC phase a burst gate signal. With respect to the generator 233, it should be appreciated that if no sync is present and therefore does not appear on line 271 from the imprecise sync detector 219, the sync presence detector 276 will through circuit 274 close the switch 248 in the clamp circuit 209 as well as a similar switch 275 in the clamp 202 so that all clamps operate on a DC feedback loop rather than permitting them to remain open. Thus, if sync is not present, the level on line 224 is placed high until sync returns and is detected. In addition, as a precautionary measure in the event the precision gate generator 230 does not receive the necessary number of burst cycles to clock it to its terminal state or count after its count cycle has been initiated, the detector 276 is coupled through circuit 274 to provide the burst gate signal to the precision gate generator 230 to assure termination of its count cycle and provision of the precision burst gate signal. This assures that the precision gate generator 230 will always properly respond to every input burst signal.

Because of the desirability of having a field index signal in the encoder switch 126 that is accurately related in phase to the input video signal's vertical sync, the output of the precision H sync separator 213 and an output of a vertical sync detector 278 (FIG. 11B) are provided to a NOR gate 279 (FIG. 11D) which provides the desired field index signal.

The reference logic circuitry 125A and 125B shown in the block diagram of FIG. 8A receive various signals from the input circuitry 93A or 93B relating to horizontal and vertical sync signals, regenerated subcarrier and the like and respectively generate a number of clock and timing control signals used in the operation of the apparatus. In addition, the computer control system 92 provides control signals to both logic circuitry 125A and 125B which cause the generation of servo sync signals which control the operating phase of the disc drives in accordance with the operation, viz, record, playback, transfer and the like, being performed by the apparatus. The reference logic circuitry is essentially duplicated so that one reference logic circuit is provided for use with the video input circuitry 93A and another for the reference input circuitry 93B, with the function of the reference logic circuitry being somewhat different during different operations of the apparatus such as recording, playback, transfer and the like. Because the logic circuitry 125A and 125B perform different functions, different inputs are received by each and all outputs that are available from each are not used.

The operation of the reference logic circuitry will now be emplained in further detail with reference to a functional block diagram shown in FIG. 10A that has a dotted line extending horizontally in approximately the middle of the drawing. As is shown thereon, the upper portion of the circuity is used only during a recording operation, whereas the lower portion is used during recording, playback and other operations performed by the signal system. The function of the upper portion of the circuitry is to generate various phase locked clock signals for recording operations using the regenerated subcarrier that was produced by the video input circuitry 93A from the color burst as has been previously described. The circuitry also generates a nonsymmetrical PALE flag signal at a rate of H/2 which is used within the circuitry to alternate the phase of the analog-to-digital converter sampling clock on consecutive horizontal lines for the reasons that have been hereinbefore described. The PALE flag is also available as an output from the reference logic circuitry 125B for use by other parts of the signal system, primarily those used in processing playback signals. The circuitry also generates a drive synchronization signal for operation of the servo control of the disc drive motors, providing a set of three pulses at a rate of 15 Hz which is multiplexed with H sync for use in controlling the disc drive servo. Other timing control signals are provided by the reference logic circuitry 125B as will be described in the following detailed description.

Referring to the upper portion of FIG. 10A, the precision phase controlled sampling clock generator of the present invention receives the subcarrier signal (SC) from either the video input circuitry 93A for the reference logic circuitry 125A or reference input circuitry 93B for the reference logic circuitry 125B on line 300 and it is extended to a phase comparator 302, the output of which appears on line 303 to a summer 304 that has a second input on line 305 provided by an integrator 306. A precision digital burst phase decoder 307 receives the actual digitized video data taken from the output of the analog-to-digital converter 95 on line 308 and decodes whether the samples were taken at the proper phase of burst and produces a plus or minus error signal to the integrator 306 via line 309 for use in adjusting the phase of the sample clock so that the video signal is always correctly sampled. The output of the summer 304 appears on line 310 which is applied to a loop amplifier and filter 311 that is connected to voltage controlled oscillator 312 by line 313 which also extends to one of two trouble lamp drivers 314. The output of the oscillator 312 appears on line 315 at a frequency of 6SC which is applied to a divide by 6 counter 316 as well as to a divide by 2 counter 317 which produces a PALE clock output at a frequency of 3SC on line 318. The divide by 6 counter has an output on line 319 at a frequency of SC which is applied to a divide by 2 counter 320 as well as to the other input of the phase comparator 302. The output of the divide by 2 counter 320 is a ½SC signal on line 321 which also extends to a pulse former 322 that is used to set and reset the divide by 2 counter 317 on alternate lines, the control being supplied through line 323 at an H/2 rate that is supplied by a PALE flag generator 324 as will be discussed hereinafter.

The operation of the upper portion of the circuit is to generate a 6SC frequency signal at the output of the voltage controlled oscillator 312 that is precisely controlled so that sampling that is performed by the analog-to-digital convertr 95 is done precisely at the same phase of the color burst synchronizing signal at all times. This is important when it is considered that the phase of the video that is sampled will ultimately determine the color that is produced by the apparatus. Thus, the phase comparator 302 having one input supplied by the divided output of the VCO 312 through line 319 provides a phase lock loop that will lock the phase of the output relatively close to the video or reference subcarrier synchronizing signal phase appearing on line 300 supplied to the other input of the comparator 302. The divided output of the VCO 312 through the phase lock loop produces an SC signal that is generally within approximately 10°. However, the digitized video output from the analog-to-digital converter 95 is also applied through line 308 to the precision digital burst phase decoder 307 which is enabled by the precision burst sampling gate signal received from the video input circuitry 93A over line 307a to generate an error signal derived during the burst interval of the video that is integrated by integrator 306 to provide an average value that is applied to the summer 304. This causes the voltage level out of the loop amplifier 311 controlling the VCO 312 to be adjusted to correct variations in the sampling times of the video signal as reflected in the burst samples provided to the decoder 307. The burst samples will represent the same quantity values for all lines if no variation in sampling times occur. By examining the sampled data actually appearing at the output of the analog-to-digital converter 95, it can be precisely determined whether the samples were taken at the proper phase and in this manner, the VCO output on line 315 which is applied to the divide by 2 counter 317 produces a PALE 3SC clock on line 318 which controls the analog-to-digital converter 95 for keeping the sampling at the proper phase. The precision digital burst phase decoder 307 effectively corrects any errors that may be produced due to temperature drifting and the like which can be on the order of 5° to 10°. In this regard, the phase of the video (or reference) subcarrier synchronizing signal on line 300 provides the basic lockup for the VCO 312 and the precision correction that appears on line 305 in the reference logic circuitry 125B is arranged to change the phase by a few degrees, i.e., up to about 20°.

With respect to the lower portion of the block diagram of FIG. 10A, the PALE flag generator 324 produces a PALE flag signal at the H/2 rate for switching a switch 325 which steers ½SC pulses into the set or reset terminals of the divide by 2 counter 317 that produces the PALE clock on the output line 318. The PALE flag changes state every line as will be described herein with respect to FIG. 10B. The PALE flag signal is nonsymmetrical so that the phase of the 3SC PALE clock is never reversed during the burst interval of the video signal even though it is reversed during the active video of alternate lines. Thus, the net effect is that only the portion of the line after burst is sampled with a clock signal whose phase is reversed on alternate lines, i.e., a nonsymmetrical signal. As is shown in FIG. 11A, the PALE flag generator 324 has inputs from the video (or reference) input circuitry 93A or 93B of H drive applied on line 326, a field index pulse on line 327 and a burst flag on line 328. The burst flag keeps the PALE flag generator from producing the PALE flag signal on line 323 until after burst has occurred, since the sampling phase of burst must not be altered for the operation of the burst phase decoder 307 in the upper portion of FIG. 10A. The PALE flag generator 324 provides an H/2 rate transfer reset pulse which is sent over line 324a to the encoder switch 126 which employs it during data transfer operations to generate a signal that is used by the encoder 96 to reset its sync word inserter.

The H drive and field index signals are also applied to a drive servo sync generator 330 which has an output extending to a drive sync switcher 331 through line 332 and it provides the basic drive sync signals on line 334 for each of the disc drives 73 when commanded by the control line 333 from the computer control system 92. The sync signals are required for all operations in which the information is transferred between a disc pack 75 and the signal system. The computer system 92 differentiates whether a record or playback operation is desired. The sync information is in the form of a multiplex sync signal that appears on lines 334 that extend to the disc drive units and includes a set of three consecutive wide pulses to indicate the first field being recorded or played back at a 15 Hz set rate as well as horizontal sync pulses (at H rate) and is used for control of the spindle servo motor. Color frame and related sync signals also are provided for control of the servo drive and for use by the reference clock generator in generating control signals used during playback operations. The color frame related sync signal is obtained from a color frame generator 301, which receives the 30 Hz field index pulse signal over line 327 and frequency divides it by 2 to obtain the 15 Hz color frame signal. The color frame signal is sent over line 329 to the disc drives 73 and the reference clock generator 98.

The specific circuitry that can be used to carry out the operation of the block diagram shown in FIG. 10A is illustrated in FIGS. 12A through 12D, which together comprise an electrical schematic diagram of the reference logic circuitry. Since the operation of the circuitry shown in the detailed schematic diagram is carried out generally in the manner as has been previously described with respect to FIG. 10A, it will not be described in detail herein. However, with respect to the digital burst phase decoder 307 shown in the upper portion of FIG. 12A, the digitized video subcarrier synchronizing signal or color burst in the form of 8 bits that is derived from the output of the analog-to-digital converter 95, appears on lines 308 which are connected to arithmetic logic units 335 which in turn connect to shift registers 336. The shift registers 336 are clocked by the logic circuitry, indicated generally at 337, which is activated upon receipt of the precision burst sampling gate over line 307a and together with the arithmetic logic units 335 perform the arithmetic steps that are necessary to determine the sign of the phase of the digitized color burst on line 309. The error of any sampling is determined by examining the quadrature component of the samples which would be zero if the samples are taken at the proper phase of the subcarrier color burst signal. More specifically, the quadrature component is proportional to the function $x1 - \frac{1}{2}(X2 + X3)$ where the samples X1, X2 and X3 are 120° apart. The clocking logic 337 performs the sequence that enables the arithmetic units 335 and shift registers 336 to carry out the arithmetic computation which will produce either a plus or minus signal on line 309 indicating an error in the phase of the actual samples.

More specifically, the precision burst sampling gate at pin 72 enables the decoder 307 at the beginning of each horizontal line of the video signal. The first sample of the video signal's color burst after the precision burst sampling gate will represent zero or close to zero phase, i.e., an axis crossing of the color burst. The next two samples of the video signal's color burst will respectively represent 120° and 240° color burst phase points (or close thereto) as described in the specification and illustrated in FIG. 9C, line (1). The amplitude of the burst is described by the equation $A \sin(WZ + \theta)$ where $\theta$ is the offset from the desired 0°, 120° and 240° sampling phase positions, if any. This equation can be decomposed into sine and cosine components as follows:

$$A \sin wt \cos \theta + A \cos wt \sin \theta.$$

It is well known that for $\theta$ near zero, the cosine of $\theta$ is approximately equal to 1 and the sine of $\theta$ is approximately equal to $\theta$. Thus, the decomposed expression reduces to $$A \sin wt + A \theta \cos wt.$$

Thus, the sampling error, $\theta$, is determinable by demodulating the cosine component of the reduced expression, which is the quadrature component of the sampled color burst.

The integrated circuit components of the decoder illustrated by FIG. 43A are coupled together to accomplish the demodulation by multiplying, in the binary number system, the sample values, X1, X2 and X3 by the numbers cos 0° cos 120° and cos 240° respectively and adding the results together. Since cos 0° = 1, cos 120° = ½ and cos 240° = −½, this yields the result $$\theta \propto X1 + \tfrac{1}{2} X2 - \tfrac{1}{2} X3.$$

Since only the sign of $\theta$ is of interest, the constant of proportionality is of no concern.

Turning now to FIG. 12A which contains circuitry 324 for generating the PALE flag signal on line 323, the H drive signal is inverted by inverter 342 and is applied via line 338 into the clock input of an FF 339 which is a divide by 2 having output line 340 applied to the input of a second FF 341 that is clocked by the burst gate or flag signal on line 328. Line 340 also extends to a NAND gate 343 as does the output line 344 from the FF 341. The operation of the PALE flag generator 324 will now be described in connection with the timing diagrams shown in FIG. 10B which has the H drive signal (line 326) shown in FIG. 10B(1), the signal on line 340 shown in FIG. 10B(2), the signal on line 344 shown in FIG. 10B(3), burst gate clock on line 328 shown in FIG. 10B(4) and the output of the NAND gate on line 345 appearing in FIG. 10B(5). The PALE flag signal on line 323 is the inverse of the signal on line 345 by virtue of inverter 346. While the PALE flag signal occurs at a rate of H/2, FIG. 10B(5) shows it to be nonsymmetrical because the output of FF 341 appearing on line 344 and applied to the NAND gate 343 is delayed with respect to the output from the first FF 339 because the FF 341 is clocked by the burst gate rather than by H drive.

What is claimed is:

1. Apparatus for sampling an analog information signal having an associated carrier signal at desired precise phase positions with respect to said carrier signal to provide discrete samples of said information signal with reference to said desired precise phase positions, comprising:
    means for sampling said information signal and providing said discrete samples in response to receiving clock signals applied thereto;
    means for generating clock signals at the output thereof for application to said sampling means, said output being phase adjustable in response to a phase control signal applied thereto;
    control signal means for providing said phase control signal for controlling the phase of the output of said clock signal generating means to sample the information signal with reference to said desired precise phase positions;
    said control signal means including means for comparing the phase of said carrier signal and the phase of the output of said clock generating means and providing a first error signal for controlling the phase of said clock generating means for maintaining the phase of the output of said generating means generally in phase locked relation with said carrier signal; and,
    said control signal means further including means for producing a second phase error between the actual phase position of said discrete samples of said carrier signal and said desired precise phase position, said control signal means applying the second phase error signal to said generating means for adjusting the phase of said clock signal generating means output signal to reduce said second phase error to approximately zero so that said discrete samples of said information signal are taken substantially with reference to said desired precise phase positions.

2. Apparatus as defined in claim 1 wherein said sampling means comprises means for measuring the instantaneous level of said information signal when clocked and converting said level to a digital signal comprising a plurality of bits of digital information.

3. Apparatus as defined in claim 2 wherein said sampling means converts said information signal to a multi-bit binary coded digital signal.

4. Apparatus as defined in claim 2 wherein said sampling means measures said information signals at a frequency of three times said carrier signal frequency.

5. Apparatus as defined in claim 1 wherein said clock generating means includes oscillator means having an output frequency that is varied in proportion to the magnitude of the voltage applied at one input thereof, said voltage being supplied by said control signal means.

6. Apparatus as defined in claim 5 wherein said clock generating means includes means connected to the output of said oscillator means for converting the frequency of the output signal thereof to the frequency of said carrier signal.

7. Apparatus as defined in claim 5 wherein said control signal means includes means for summing said first and second error signals, the output of said summing means being applied to said clock signals generating means.

8. Apparatus as defined in claim 7 wherein said control signal means further includes means for amplifying said output signal of said summing means, said amplifying means being positioned intermediate said clock generating means and said summing means.

9. Apparatus as defined in claim 7 wherein said second error producing means produces a positive or negative signal indicating the phase of the sample of said carrier signal is ahead of or behind said desired precise phase position, and further includes means for time integrating the positive and negative signals to produce said resulting second phase error signal for application to said summing means.

10. Apparatus as defined in claim 9 wherein said second error producing means of said control signal means includes means for examining said actual discrete samples of said carrier signal to determine the quadrature component thereof, and producing said positive or negative signal in the event the quadrature component is other than zero, and producing no error signal in the event the quadrature component is zero.

11. Apparatus for sampling an analog video information signal having an associated color subcarrier synchronizing signal, said sampling occurring at desired precise phase positions with reference to said color subcarrier synchronizing signal to provide discrete samples representing the information content of said information signal taken with reference to said desired precise phase positions, comprising:

means for sampling said information signal to provide a signal representing the level of said information signal at sampling time in response to a clock signal being applied thereto;

means for generating said clock signal for application to said sampling means to sample said information signal with reference to predetermined phase positions of said color subcarrier synchronizing signal;

means for controlling the phase of the output of said clock generating means by comparing the phase of the output thereof with the phase of said color subcarrier synchronizing signal and generating a first error signal for application to said clock generating means for adjusting the phase of the clock signal so that the output of said generating means is generally phase locked to said color subcarrier synchronizing signal;

means for examining said discrete samples of said color subcarrier synchronizing signal and generating a second error signal reflecting any phase error between the actual phase position of said samples and the desired precise phase position and applying said second error signal to said generating means to adjust the phase of the output thereof to reduce said second error signal to approximately zero and thereby sample that information signal with reference to said precise phase positions of said color subcarrier synchronizing signal.

12. Apparatus as defined in claim 11 wherein said sampling means comprises means for measuring the instantaneous level of said information signal when clocked and converting said level to a digital signal comprising a plurality of bits of digital information.

13. Apparatus as defined in claim 12 wherein said sampling means converts said information signal to a multi-bit binary coded digital signal.

14. Apparatus as defined in claim 12 wherein said sampling means measures said information signal at a frequency of three times said color subcarrier synchronizing signal frequency.

15. Apparatus as defined in claim 11 wherein said clock generating means includes oscillator means having an output frequency that is varied in proportion to the magnitude of the voltage applied at one input thereof, said voltage being supplied by said controlling means and by said examining means.

16. Apparatus as defined in claim 15 wherein said clock generating means includes means connected to the output of said oscillator means for converting the frequency of the output signal thereof to the frequency of said color subcarrier synchronizing signal.

17. Apparatus as defined in claim 15 including means for summing said first and second error signals, the output of said summing means being applied to said clock signal generating means.

18. Apparatus as defined in claim 17 further including means for amplifying said output signal of said summing means, said amplifying means being positioned intermediate said clock generating means and said summing means.

19. Apparatus as defined in claim 17 wherein said second error generating means produces a positive or negative signal indicating the phase of the sample of said color subcarrier synchronizing signal is ahead of or behind said desired precise phase position and further includes means for time integrating the positive and negative signals to produce said resulting second phase error signal for application to said summing means.

20. Apparatus as defined in claim 19 wherein said second error producing means of said control signal means includes means for examining said actual discrete samples to determine the quadrature component thereof, and producing said positive or negative signal in the event the quadrature component is other than zero, and producing no error signal in the event the quadrature component is zero.

21. A method of sampling an analog information signal having an associated carrier signal at precise phase positions with respect to said carrier signal, comprising the steps of:

sampling said information signal at predetermined phase positions of said carrier signal to provide discrete samples of said information signal, said sampling being controlled by a sampling clock signal;

generating said sampling clock signal using said carrier signal in a phase locked loop to maintain the clock signal within a reasonably close phase relation so that said samples are taken generally with reference to said predetermined phase positions of said carrier signal;

examining said discrete samples of said carrier signal and generating an error an indicating any phase deviation from said desired precise phase position;

adjusting the phase of said sampling clock using said error signal to reduce said phase deviation and thereby sample said information signal with reference to said precise phase positions of said carrier signal.

22. A method of providing a digitized signal from an analog color video information signal having a color subcarrier synchronizing signal and provide samples taken at precisely defined phase positions relative to said color subcarrier synchronizing signal, comprising the steps of:

sampling said analog signal at a sampling rate sufficient to provide digitized signals that contain sufficient information content that permit subsequent reconstruction of said video signal using sampling means controlled by a sampling clock, said samples being taken at predetermined intervals within the color subcarrier synchronizing signal cycle;

locking the phase said sampling clock with the phase of said color subcarrier synchronizing signal using a phase locked loop to accomplish said sampling generally with reference to said desired phase positions of said color subcarrier synchronizing signal;

examining said resulting digitized samples of said color subcarrier synchronizing signal and generating an error signal representing the difference between the actual phase locations and the desired precise phase locations for said digitized samples and applying said error signal to said sampling clock to adjust the phase of the output of the same to reduce said error signal to about zero and thereby provide said samples with reference to said precisely defined phase positions.

23. A method as defined in claim 22 wherein the difference between the actual phase locations and the desired precise phase locations for said digitized samples of said color subcarrier synchronizing signal is derived by examining said digitized samples to determine the quadrature component thereof and producing a positive or negative error signal in the event the quadrature component is other than zero and no error signal in the event the quadrature component is zero.

24. A method as defined in claim 22 wherein said sampling is done at a rate of three times the frequency of said color subcarrier synchronizing signal.

25. A method as defined in claim 24 wherein said sampling is performed at three phase locations within each cycle of said color subcarrier synchronizing signal, each phase location being equally spaced from adjacent phase locations.

* * * * *